United States Patent
Roodenburg et al.

(10) Patent No.: US 9,080,696 B2
(45) Date of Patent: Jul. 14, 2015

(54) MARINE PIPELAYING VESSEL AND METHOD FOR PIPELAYING

(71) Applicant: ITREC B.V., Schiedam (NL)

(72) Inventors: Joop Roodenburg, Delft (NL); Rick Van Der Valk, Schiedam (NL); Terence Willem August Vehmeijer, The Hague (NL); Ronny Lambertus Waltherus Nouwens, Schiedam (NL)

(73) Assignee: ITREC B.V., Schiedam (NL)

( * ) Notice: Subject to any disclaimer, the term of this patent is extended or adjusted under 35 U.S.C. 154(b) by 0 days.

(21) Appl. No.: 14/365,208

(22) PCT Filed: Dec. 10, 2012

(86) PCT No.: PCT/NL2012/050869
§ 371 (c)(1),
(2) Date: Jun. 13, 2014

(87) PCT Pub. No.: WO2013/089561
PCT Pub. Date: Jun. 20, 2013

(65) Prior Publication Data
US 2014/0334880 A1 Nov. 13, 2014

(30) Foreign Application Priority Data

Dec. 14, 2011 (NL) ...................................... 2007971
Dec. 21, 2011 (NL) ...................................... 2008010

(51) Int. Cl.
| | | |
|---|---|---|
| F16L 1/18 | (2006.01) | |
| F16L 1/19 | (2006.01) | |
| F16L 1/225 | (2006.01) | |
| F16L 1/23 | (2006.01) | |
| B63B 35/03 | (2006.01) | |

(52) U.S. Cl.
CPC . *F16L 1/18* (2013.01); *B63B 35/03* (2013.01); *F16L 1/19* (2013.01); *F16L 1/225* (2013.01); *F16L 1/23* (2013.01)

(58) Field of Classification Search
CPC ...................................... F16L 1/18; F16L 1/19
USPC .................... 405/166, 168.3, 168.4, 169, 170
See application file for complete search history.

(56) References Cited

U.S. PATENT DOCUMENTS

| | | |
|---|---|---|
| 5,857,715 A | 1/1999 | Gray et al. |
| 2003/0147699 A1 | 8/2003 | Long et al. |

FOREIGN PATENT DOCUMENTS

| | | |
|---|---|---|
| GB | 2477755 A | 8/2011 |
| WO | WO 2006/085739 A1 | 8/2006 |
| WO | WO 2009/134124 A2 | 11/2009 |

*Primary Examiner* — Sunil Singh
(74) *Attorney, Agent, or Firm* — Birch, Stewart, Kolasch & Birch, LLP

(57) ABSTRACT

The present invention relates to a marine pipelaying vessel for S-lay pipelaying an offshore pipeline and integrating one or more accessories into the pipeline, and a method for S-lay pipelaying wherein use is made of such a vessel. The vessel according to the invention comprises a hull (1) having a stinger end and a stinger (20) for guiding the launched pipeline in a curved pipeline trajectory, which stinger is pivotably connected to the hull, and an accessory handling J-lay tower (30) at the stinger end of the hull. The J-lay tower allows the pipeline and connected accessory to be laid in J-lay mode while connecting further pipe sections to the pipeline at least until the accessory has been lowered past below the retracted stinger. A stinger support assembly (15) is provided for supporting the stinger in a pipelay position, and for allowing movement of the stinger between the pipelay position and a steep downwardly pivoted retracted position by pivoting the stinger about its stinger pivot axis, wherein the stinger in the retracted position is away from the J-lay firing line.

12 Claims, 31 Drawing Sheets

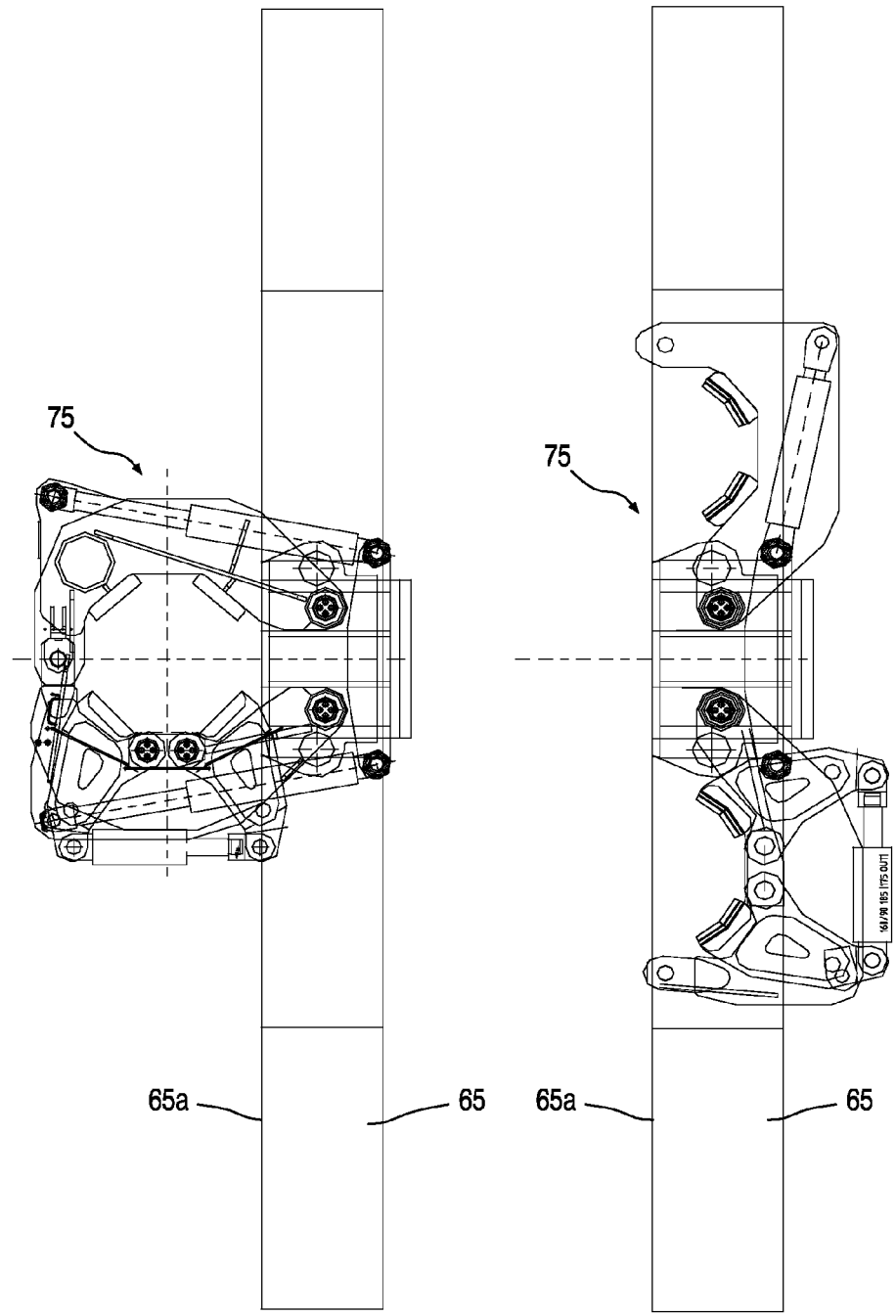

MARINE PIPELAYING VESSEL AND METHOD FOR PIPELAYING

The present invention relates to a marine pipelaying vessel for S-lay pipelaying an offshore pipeline and integrating one or more accessories into the pipeline.

S-lay pipelaying vessels common have a substantially horizontal pipeline assembly installation with welding stations and one or more tensioners to support the weight of the launched pipeline. The assembly takes place by welding pipe sections to the end of the pipeline. The pipeline moves from the assembly installation over an elongated stinger that supports the pipeline as it bends downward in a trajectory towards the seabed. There the pipeline is subjected to a further bending in order to come to rest on the seabed.

Developments in the field of pipelaying nowadays allow for S-lay pipelaying in deep water and of large diameter pipeline. As a result the weight of the pipeline suspended between the vessel and the seabed is enormous, requiring massive stingers and making the passage of the pipeline over the stinger an even more critical event than in the past.

A further development in the field of pipelaying is the integration of accessories into the pipeline to be laid, an accessory often having cross-sectional dimensions significantly greater than the pipeline itself. Also accessories often have a stiffness that differs significantly from the pipeline, mostly the accessory being stiffer, thereby creating another potential problem in the launching of a pipeline with accessory from an S-lay vessel. Notably pipelines are to be fitted with one or more so-called Pipeline End Terminals (PLET's) and/or intermediate Pipeline accessories (ILS), e.g. having one or more valves and/or one or more pipeline branching devices, e.g. with one or more pipeline tie-in devices.

In WO2006/085739 an S-lay pipelaying vessel is disclosed provided with one or more tensioners as well as with a pipeline clamp downstream of the tensioners, just in front of the hull end of the stinger. It is disclosed that an accessory may be fitted into or on an end of the pipeline to be laid. This is done at a station between the pipeline clamp and the tensioner, allowing—when needed—to support the pipeline by means of said pipeline clamp. After the accessory has been fitted onto the pipeline, the (further) launching of the pipeline in S-lay mode involves passing the pipeline with the accessory therein over the stinger in its pipelaying position. When the accessory is a trailing PLET, the further launching may be done using the A&R system of the vessel.

Stingers generally impose restrictions on the accessory that can pass over the stinger in pipelaying position.

U.S. Pat. No. 5,857,715 discloses an example of an accessory that is specifically designed and dimensioned to pass over a stinger.

Developments in the field nowadays call for accessories to be fitted in the pipeline that can not be adequately passed over practical stingers. For instance an accessory may have a bottom side, e.g. a mud mat, that is located more than 1 meter, e.g. between 1 and 2.5 meters, below the centerline of the pipeline. The bottom width of the accessory may be between 3 and 7 meters and the accessory height may be between 3 and 6 meters. The length of the accessory may well be between 5 and 15 meters.

As the passage of the pipeline over the stinger during S-lay already is a critical event, even without the presence of an accessory, it is found that practical stinger designs as well as available methods for launching a pipeline equipped with an accessory in S-lay mode along a stinger of an S-lay pipelaying vessel are inadequate. As a consequence on S-lay vessels nowadays accessories are fitted on the pipeline with various time-consuming and complex techniques. An example is an approach to fit a trailing PLET onto the pipeline made in S-lay mode, wherein the upper end of the already launched pipeline is picked up by a crane and then brought to another location of the vessel, e.g. at a side of the vessel. The accessory is then fitted onto the pipeline at the side of the vessel. Then pipeline is lowered to the seabed.

The present invention aims to provide improvements allowing the efficient laying of pipeline with one or more accessories, e.g. accessories of substantial size, fitted on the pipeline, e.g. at an intermediate position in the pipeline or at an end of the pipeline.

The vessel according to the invention comprises:
 a hull having a stinger end and two cantilever structures extending at the stinger end of the hull;
 a pipeline assembly installation including one or more welding stations to weld pipe sections to the end of a launched pipeline;
 one or more tensioners (mounted to the hull) downstream of the pipeline assembly installation for supporting the weight of the launched pipeline;
 a stinger for guiding the launched pipeline in a curved pipeline trajectory, which stinger is pivotably connected to the stinger end of the hull such that the stinger is pivotable about a horizontal stinger pivot axis, and wherein the stinger extends between the two cantilever structures;
 an accessory handling J-lay tower at the stinger end of the hull, for supporting an accessory to be connected to the pipeline and for launching in J-lay mode said pipeline with the accessory connected thereto along a J-lay firing line;
 a stinger support assembly for supporting the stinger in a pipelay position, and for allowing movement of the stinger between the pipelay position and a steep downwardly pivoted retracted position by pivoting the stinger about its stinger pivot axis, wherein the stinger in the retracted position is away from the J-lay firing line;
 a displaceable hang off clamp for supporting the weight of the launched pipeline when disconnected from the tensioners, which clamp is displaceable while supporting the weight of the launched pipeline between a first position in which the hang off clamp can be clamped on the pipeline downstream of the one or more tensioners during S-lay to allow disconnection of the pipeline from the tensioners and a second position in the J-lay firing line of the accessory handling J-lay tower such that the pipeline supported by the hang off clamp can be aligned with the accessory supported by the accessory handling J-lay tower and can be connected thereto;
the J-lay tower allowing the pipeline and connected accessory to be laid in J-lay mode while connecting further pipe sections to the pipeline at least until the accessory has been lowered past below the retracted stinger.

The vessel according to the invention comprises a hull having a stinger end and two cantilever structures extending at the stinger end of the hull.

The vessel can be a monohull vessel, a catamaran, or a multihull vessel.

The stinger end can be provided either at the aft side of the vessel, as is preferred, or at the bow side of the vessel.

The cantilever structures can be formed integral with the hull of the vessel, in which case the hull has a U-shaped stinger end, in a view from above.

Preferably the cantilever structures are partly submerged to provide buoyancy, but an arrangement above the waterline is also possible.

Alternatively, the cantilever structures are structures that are connectable to the hull.

The cantilever structures can be configured as two parallel beams, or alternatively for example as two pyramid-shaped structures flaring outwards, connected with its broadest end to the stinger end of the hull and having an increased width between them further away from the stinger end of the hull, seen from above.

Preferably the J-lay tower is supported on the cantilever structures, more preferably pivotal about a tilt axis.

On the vessel a pipeline assembly installation is provided including one or more welding stations to weld pipe sections to the end of a launched pipeline. The welding stations are possibly mounted stationary on the S-lay assembly deck of the vessel, although it is also conceivable that movable welding stations are used, e.g. welding stations provided on a frame which is movable across the deck of the vessel, e.g. in longitudinal direction so as to move with the pipeline during S-laying.

The vessel according to the invention comprises one or more tensioners, downstream of the pipeline assembly installation for S-lay, said tensioners being adapted to support the weight of the launched pipeline during S-lay.

The vessel according to the invention comprises a stinger for guiding the launched pipeline in a curved pipeline trajectory during S-lay, which stinger is pivotally connected to the hull such that the stinger is pivotable about a horizontal stinger pivot axis.

An accessory handling J-lay tower is provided at the stinger end of the hull, for supporting an accessory to be connected to the pipeline in a position above the upper end of the launched pipeline that is then oriented along a J-lay firing line and for launching in J-lay mode said pipeline with the accessory connected thereto along the J-lay firing line.

Preferably, the J-lay firing line extends at a side of the J-lay tower opposite the stinger end of the hull, but it is also conceivable that the J-lay firing line extends at the side of the J-lay tower at the stinger end of the hull.

In a possible embodiment, the J-lay tower is tiltable about a tower pivot axis, parallel to stinger pivot axis. In an embodiment, the tower is a tiltable tower, and wherein a tower inclination adjuster system is provided to adjust the inclination of the tower. In this way, the laying angle of the pipeline with the accessory is adjustable, which is particularly advantageous when the water depth varies. The J-lay tower preferable includes a sharp angle or slightly blunt angle with the hull of the vessel, which angle is preferably between 45 and 110°, in particular between 70 and 90°.

It is envisaged that the J-lay tower allows the pipeline and connected accessory to be laid in J-lay mode, while connecting further pipe sections to the pipeline and continued launching of said pipeline towards the seabed. In particular when a PLET is fitted at a trailing end of the pipeline one may envisage the use of an abandonment and recovery (A&R) cable to lower the pipeline with the accessory onto the seabed.

In general, an accessory may be provided at one of the ends of the offshore pipeline or at an intermediate position of the offshore pipeline. For example Pipeline End Terminals (PLET) are provided either at the leading end or the trailing end of the pipeline, and inline structures (ILS) are to be provided within the offshore pipeline. The J-lay tower according to the invention allows the pipeline and connected accessories such as an ILS or leading end PLET to be laid in J-lay mode, while connecting further pipe sections to the pipeline.

The J-lay tower may be embodied to allow the pipeline and connected accessory such as a trailing end PLET to be lowered using an abandonment and recovery (A&R) cable.

Once the accessory has lowered past below the retracted stinger, the pipelaying operation is preferably continued in the S-lay mode as this pipelaying method is generally faster and more efficient than pipelaying in the J-lay mode. Hence, the stinger is allowed to move back from the steep downwardly pivoted retracted position into the pipelay position. Preferably the hang off clamp is allowed to move back from the position in the J-lay firing line to the position downstream of the one or more tensioners.

The accessory is provided to the J-lay firing line side of the accessory handling J-lay tower to be supported by the accessory handling J-lay tower or any associated loader device. Possibly, a crane is used to provide the accessory to the J-lay firing line side of the accessory handling J-lay tower. It is advantageous if the J-lay firing line extends at a side of the J-lay tower opposite the stinger end of the hull as there is more accessory handling space at this side.

The vessel according to the invention comprises a displaceable hang off clamp for supporting the weight of the launched pipeline when disconnected from the tensioners. In view of the weight of the launched pipeline, the minimum capacity of the hang off clamp preferably exceeds 100.000 kilograms, even more preferably exceeds 500.000 kilograms.

The hang off clamp is displaceable, while supporting the weight of the launched pipeline, between a first position and a second position. The travelling speed of the hang off clamp under load by the pipeline is preferably in the order of 0.5 m/s. In a practical embodiment, the distance between the first and the second position of the hang off clamp exceeds 25 meters, and is preferably in the range of 40-60 meters.

In the first position the hang off clamp can be clamped on the pipeline, downstream of the one or more tensioners, during S-lay, to allow disconnection of the pipeline from the tensioners. This disconnection is in a practical approach done by severing the pipeline.

The second position of the hang off clamp is positioned in the J-lay firing line of the accessory handling J-lay tower; such that the launched pipeline supported by the hang off clamp can be aligned with the accessory supported by the accessory handling J-lay tower and can be connected thereto.

When S-laying is terminated in view of continuing the pipelaying in J-lay mode, the hang off clamp supporting the launched pipeline is displaced between the first position downstream of the S-lay tensioners and a second position in the J-lay firing line, whereas the stinger is moved from its S-lay pipelaying position to its retracted position away from the J-lay firing line. These movements of the hang off clamp and the stinger can be performed in many different timed relations, wherein the need to prevent overstressing of the pipeline is a significant factor to be considered.

In a possible embodiment the vessel comprises a displaceable hang off clamp frame by which the hang off clamp is supported. As such, it is possible for the hang off clamp frame to be displaceable substantially horizontally between the first and second position, while the hang off clamp is tiltably supported about a horizontal clamp tilt axis. This is advantageous as the hang off clamp in the first position clamps the pipeline while the pipeline extends essentially horizontally, while in the second position the pipeline supported by the hang off clamp extends according to the J-lay angle to be aligned with and connected to the accessory. Hence, the hang off clamp is allowed to tilt between an essentially horizontal position in the first position of the hang off clamp and an essentially vertical position in the second position of the hang off clamp. It is preferred that the tilting of the hang off clamp is controlled.

In a further possible embodiment, the hang off clamp frame supports a working station comprising a floor above the hang off clamp, the working station providing a shielded environment for welding the accessory to the pipeline. The working station is preferably embodied as a cabin comprising a ceiling, multiple walls and a floor, to establish the shielded environment.

In a possible embodiment, the vessel is provided with two parallel rails supporting the hang off clamp frame between the first and second position. These rails possibly extend over both cantilevers. In a possible configuration the rails extends beyond the stinger end and beyond stinger pivot axis.

In an embodiment a second hang off clamp for the pipeline is provided on the vessel, said second clamp being dedicated for supporting the pipeline in the J-lay process. Said second clamp can be supported by the J-lay tower (preferably at a lower end of the tower, preferably retractable out of the J-lay firing line to allow for passage of the accessory) or supported by a separate clamp support device near the lower end of the J-lay tower. It is envisaged that when the pipeline has been brought into the J-lay firing line by means of the first hang off clamp (that supports the pipeline during the first clamp motion from its first to its second position), the pipeline is then handed over to the second hang off clamp and the pipeline weight is then supported by said second clamp, allowing the first hang off clamp to be released from the pipeline and moved to a position out of the J-lay firing line.

The vessel according to the invention further comprises a stinger support assembly for supporting the stinger in a pipelay position, and for allowing movement of the stinger between the pipelay position and a steep downwardly pivoted retracted position by pivoting the stinger about its stinger pivot axis, wherein the stinger in the retracted position is away from the J-lay firing line.

In a possible embodiment, the stinger pivot axis is mounted on a movable support structure that is movable in a direction of the longitudinal axis of the vessel. In this possible embodiment, in addition to the pivoting movement of the stinger to its retracted position, a translational movement of the stinger pivot axis is possible to move with the stinger from the pipelay position to the retracted position, away from the firing line. Possibly, a skiddable frame is provided to allow a skidding movement of the stinger pivot axis structure.

The stinger support assembly is possibly embodied as a frame, mounted on the hull or on the cantilevers. The support assembly preferably comprises a winch and cables, which cables are to be connected to the stinger, to guide the movement of the stinger between the pipelay position and a steep downwardly pivoted retracted position by releasing the cables.

Possibly, the frame of the stinger support assembly extends beyond the cantilever structures.

In an embodiment, the accessory handling J-lay tower is integrated with the stinger support assembly. Hence, a tower is provided at the stinger end of the hull, both for supporting an accessory and for launching in J-lay mode said pipeline, and for supporting the stinger and for allowing movement of the stinger.

As indicated above, in a possible embodiment, the J-lay tower is tiltable about a tower pivot axis, parallel to stinger pivot axis. In a possible embodiment, the J-lay tower is allowed to include a blunt angle with the deck of the vessel of 90-135°, hence extending beyond the stinger end of the hull, to allow handing over the launched pipeline, possibly including an accessory, to a platform or other vessel, similar to the system described in EP 2 281 133. In a preferred embodiment, the stinger support assembly is embodied such that this handing over of the launched pipeline is simplified. Hence, the stinger support assembly should not comprise frame parts obstructing the tilting movement of the J-lay tower.

In an embodiment, the tower is provided with a vertically movable travelling block having a head clamp connectable to an upper end of the pipeline, said travelling block being connected via one or more cables to one or more winches to allow for controlled vertical motion of the head clamp and the pipeline suspended from the head clamp.

In an embodiment, the tower is provided with parallel vertical guide rails for the travelling block with the head clamp.

In an embodiment, the vessel according to the invention further comprises an accessory loader device adapted to receive the accessory in a receiving position, preferably a horizontal receiving position, and to bring the accessory into the J-lay firing line so as to allow for connection thereof to the launched pipeline, wherein preferably the accessory loader device is mounted on the accessory handling J-lay tower.

In an embodiment, a passage opening for a pipeline accessory is present between said vertical guide rails allowing to pass the accessory by means of the accessory loader device from a receiving position at one side of the tower to the firing line position at the other side of the tower, wherein preferably the horizontal distance between guide rails is at least 5 meters, e.g. between 5 and 10 meters, e.g. 8 meters.

In an embodiment, the tower comprises a load bearing tower structure having two legs, each pivotally connected at a lower end thereof about a horizontal tower tilt axis to an associated cantilever structure.

In an embodiment, the legs are connected at upper ends thereof by a horizontal top beam, said beam supporting sheaves guiding one or more cables supporting a travelling block with a head clamp connectable to an upper end of the pipeline.

In an embodiment, the tower structure comprises a horizontal top beam connecting the legs near an upper end thereof and a horizontal lower beam connecting the legs near lower ends thereof, wherein a passage opening for a pipeline accessory is present between said top beam and said lower beam, wherein the vertical height between said beams is preferably at least 10 meters.

In an embodiment, the tower is provided with a vertically movable travelling block having a head clamp connectable to an upper end of the pipeline, said travelling block being connected via one or more cables to one or more winches to allow for controlled vertical motion of the head clamp and the pipeline suspended from the head clamp, and wherein said one or more winches are mounted on the tower.

In an embodiment, the accessory loader device is provided with a line-up tool adapted to align the accessory with the launched pipeline.

In an embodiment, the accessory loader device comprises a main loader frame that is pivotally connected to the tower so as to be pivotable by an associated pivoting device between a substantially horizontal receiving position and a position aligned with the J-lay firing line.

In an embodiment, the tower comprises a load bearing tower structure having two legs, each pivotally connected at a lower end thereof about a horizontal tower tilt axis to an associated cantilever structure, and wherein the tower structure comprises a horizontal beam interconnecting said legs, and wherein the main loader frame is pivotally connected to said horizontal beam.

In an embodiment, said accessory loader device includes a loader subframe adapted to be engaged with and retain thereon the accessory, which loader subframe is supported movably on a main loader frame of the loader device to allow for line-up motion of retained accessory in one or more directions in order to align the accessory with the launched pipeline, and wherein one or more actuators are provided between said main loader frame and said loader subframe adapted to cause said line-up motion, e.g. allow for angular motion about at least two perpendicular axes and/or translation along one or more axis.

In an embodiment, the accessory to be handled by the accessory loader device is provided with a standard accessory handling frame, preferably of uniform principal dimensions to allow for efficient handling of multiple accessories on board of the pipelaying vessel, and wherein the standard accessory handling frame is releasably connectable to the loader subframe, e.g. by releasable fastening means adapted to temporarily fasten the accessory handling frame on the loader subframe.

In an embodiment, the accessory loader device comprises one or more pipe section grippers allowing the accessory loader device to supply pipe section to the J-lay tower during pipelaying in J-lay mode.

In an embodiment, the loader subframe is provided with one or more pipe section grippers, preferably two vertically spaced apart pipe section grippers, said pipe grippers being adapted to grip and retain a pipe section to be connected to the launched pipeline in J-lay mode.

In an embodiment, the one or more pipe grippers are movable between a deployed position wherein the one or more pipe grippers extend forward of a support face of the loader subframe and a retracted position wherein the one or more pipe grippers are retracted with respect to said support face.

In an embodiment, the accessory loader device, e.g. a main loader frame thereof when present, comprises a pipe centralizer adapted to engage on and centralize a pipe section integrated into the accessory and extending upwards when said accessory is aligned with the J-lay firing line.

In an embodiment the pipeline assembly installation is arranged in the longitudinal midplane of the vessel.

In an embodiment the J-lay firing is laterally offset from the S-lay firing line, and the hang off clamp is supported such, e.g. by a frame that a displacement between the first position and the second position of the clamp includes a lateral displacement of said clamp whilst supporting the launched pipeline after it is disconnected from the S-lay assembly line tensioners, e.g. by skidding the clamp laterally with respect to a longitudinally movable, e.g. skiddable, support frame.

In an embodiment the vessel is provided with a displaceable hang off clamp frame that supports the hang off clamp, the vessel being provided with a pair of rails in longitudinal direction, preferably rectilinear rails, upon which the frame is supported and along which the frame travels, preferably the rails being embodied as skid rails to allow for skidding of the frame over the rails.

In an embodiment an accessory loading device is arranged laterally offset from the J-lay firing line, e.g. next to the J-lay tower structure.

In an embodiment an accessory loader device is provided and is adapted to receive an accessory thereon on in a substantially horizontal receiving position and to bring said accessory in a upwardly tilted position oriented alongside the J-lay firing line of the tower, the loader device and tower being adapted to allow for translation of the upwardly tilted accessory along one or more horizontal support rails so as to bring the accessory in a position aligned with the J-lay firing line.

In an embodiment the vessel comprises a crane with a boom having an effective reach that covers an accessory loader device in its receiving position, e.g. a mast crane with a slewable boom, so as to allow for lifting an accessory and place it on the loader device, e.g. with a main loader frame thereof in horizontal position.

In an embodiment an accessory loader device is provided including a loader subframe adapted to be engaged with and retain thereon an accessory, wherein the loader subframe is supported movably on a main loader frame of the loader device to allow for lateral translation of the subframe with the accessory thereon onto horizontal rails on the tower in order to align the accessory with the J-lay firing line.

In an embodiment the J-lay tower is provided with one or more J-lay tensioners, e.g. two above one another, in addition to the one or more S-lay tensioners that are mounted on an S-lay assembly working deck of the vessel for use during S-lay.

In an embodiment the one or more J-lay tensioners are mounted in retractable manner on the tower, between an active position in the J-lay firing line and a retracted position out of the firing line.

In an embodiment the J-lay tower is provided with an aligner or pipeline guiding device, e.g. a guide wheel, at an elevated position above one or more J-lay tensioners on the tower.

In an embodiment one or more mobile workstation, e.g. welding and/or coating stations, are provided on the tower.

In an embodiment a pipe line-up tool is provided on the tower for use during continued J-lay operation when pipe sections are welded onto the launched pipeline, e.g. the tool being retractable as it is guided over horizontal rails on the tower to allow for lateral displacement between an active position in the J-lay firing line and a retracted position out of the J-lay firing line to allow for the positioning of an accessory at said location in the tower.

In an embodiment the J-lay tower is integrated into a combined J-lay tower and loader device support tower structure, wherein the J-lay tower and an accessory loader device are side by side in lateral direction.

In an embodiment, the vessel comprises a stinger securing system for securing the stinger in the retracted position, the stinger securing means preferably comprising a winch and a cable connectable to the stinger, preferably allowing to pull the steep downwardly retracted stinger further away from the J-lay firing line.

In an embodiment—in use—the stinger is secured in its retracted position by simultaneous exerting opposite directed forces thereon by means of the stinger securing system and by the stinger support assembly.

For example the stinger is arranged at the stern or aft end of the hull and the stinger securing system is embodied and operated to pull the submerged stinger in forward direction, towards the bow of the vessel away from the J-lay firing line.

The present invention further relates to a method for S-lay pipelaying an offshore pipeline and integrating one or more accessories into the pipeline wherein use is made of a vessel according to the invention comprising the following steps:
welding pipe sections to the end of a launched pipeline, wherein one or more tensioners support the weight of the launched pipeline;
providing the displaceable hang off clamp in a first position;
clamping the hang off clamp on the pipeline downstream of the one or more tensioners during S-lay;
disconnecting the pipeline from the tensioners;

pivoting the stinger from the pipelay position to a steep downwardly pivoted retracted position, wherein the stinger in the retracted position is away from the J-lay firing line;

displacing the hang off clamp while supporting the weight of the launched pipeline from the first position to a second position in the J-lay firing line;

providing an accessory to the accessory handling J-lay tower and supporting the accessory by the accessory handling J-lay tower;

aligning the pipeline supported by the hang off clamp with the accessory supported by the accessory handling J-lay tower;

connecting the pipeline supported by the hang off clamp with the accessory supported by the accessory handling J-lay tower;

launching in J-lay mode said pipeline with the accessory connected thereto along a J-lay firing line;

connecting further pipe sections to the pipeline and lowering the pipeline at least until the accessory has been lowered past below the retracted stinger.

In a possible embodiment, the method further comprises the step of pivoting the stinger from steep downwardly pivoted retracted position upward to the pipelay position to guide the launched pipeline in a curved pipeline trajectory.

The present invention also relates to a travelling block assembly for a J-lay pipelaying tower, either for use in the tower of the inventive vessel or on another J-lay tower vessel, said assembly comprising a pair of parallel and vertically oriented guide rails, a travelling block having a frame provided with rail engaging members at opposed horizontal ends of the frame, a head clamp centrally suspended from the frame, wherein one of the rail engaging members is pivotally connected to the frame about a vertical pivot axis to compensate for variations of the spacing between the guide rails.

The present invention also relates to a travelling block assembly for a J-lay pipelaying tower, either for use in the tower of the inventive vessel or on another J-lay tower vessel, said assembly comprising a pair of parallel and vertically oriented guide rails, a travelling block having a frame provided with rail engaging members at opposed horizontal ends of the frame, a head clamp centrally suspended from the frame, wherein the frame supports an internal line-up clamp garage adapted for storage of an internal line-up clamp, wherein preferably said garage is on top of the frame.

The present invention also relates to a travelling block for in a J-lay pipelaying tower, either for use in the tower of the inventive vessel or on another J-lay tower vessel, e.g. a tower provided with a pair of parallel and vertically oriented guide rails for the travelling block, wherein the travelling block has a frame, e.g. provided with rail engaging members at spaced apart horizontal locations on the frame, and wherein the travelling block has a head clamp centrally suspended from the frame such that in use the J-lay firing line passes through the head clamp, wherein the frame has as opening above the head clamp allowing for passage of an A&R wire through the frame and the head clamp along the J-lay firing line, and wherein, preferably the frame supports an internal line-up clamp garage adapted for storage of an internal line-up clamp, preferably said garage is on top of the frame, said garage being displaceable relative to the frame between a position in the J-lay firing line and a retracted position away from said firing line to allow for the passage of the A&R wire.

The present invention also relates to a marine pipelaying vessel for S-lay pipelaying of an offshore pipeline and integrating one or more accessories into the pipeline, the vessel comprising:

a hull;

an S-lay pipeline assembly installation arranged in longitudinal direction on said hull, said installation including one or more welding stations to weld pipe sections to the end of a launched pipeline during S-lay and one or more S-lay tensioners at the downstream end of the pipeline assembly installation for supporting the weight of the launched pipeline during S-lay;

a stinger extending in line with the pipeline assembly installation and being pivotal relative to the hull at a hull end of the stinger, said stinger being adapted to guide the pipeline in a curved pipeline trajectory during S-lay, an accessory handling J-lay tower arranged on the vessel at a position that is longitudinally spaced from the hull end of the stinger in the direction away from the S-lay pipeline assembly installation, wherein the J-lay tower allows to support an accessory to be connected to the pipeline and for launching in J-lay mode said pipeline with the accessory connected thereto along a J-lay firing line;

a stinger support assembly for supporting the stinger in a pipelay position and for allowing movement of the stinger at least between the pipelay position and a steep downwardly pivoted retracted position by pivoting the stinger, wherein the stinger in the retracted position is away from the J-lay firing line;

a displaceable hang off clamp for supporting the weight of the launched pipeline when disconnected from the S-lay tensioners, which clamp is displaceable while supporting the weight of the launched pipeline between a first position in which the hang off clamp can be clamped on the pipeline downstream of the one or more S-lay tensioners during S-lay to allow disconnection of the pipeline from said tensioners and a second position in the J-lay firing line of the accessory handling J-lay tower such that the pipeline can be aligned with the accessory supported at the accessory handling J-lay tower and can be connected thereto;

the J-lay tower allowing the pipeline and connected accessory to be laid in J-lay at least until the accessory has been lowered past below the retracted stinger.

The skilled person will appreciate that this vessel may optionally be provided with one or more of the technical features discussed herein with reference to the vessel of claim 1. In particular the vessel may comprising a displaceable hang off clamp frame in which the hang off clamp is tiltable supported about a horizontal clamp tilt axis, wherein the hang off clamp frame is displaceable substantially horizontal between the first and second position, preferably the vessel being provided with parallel rails supporting the hang off clamp frame between the first and second position.

Advantageous embodiments of the first and second aspect of the invention are disclosed in the subclaims and in the description referring to the drawings.

In the drawings;

FIG. 29 shows a schematic top view of a pipe section gripper according to the invention, in a closed position;

FIG. 30 shows a schematic top view of the pipe section gripper of FIG. 29, in an opened position;

Figure 1:
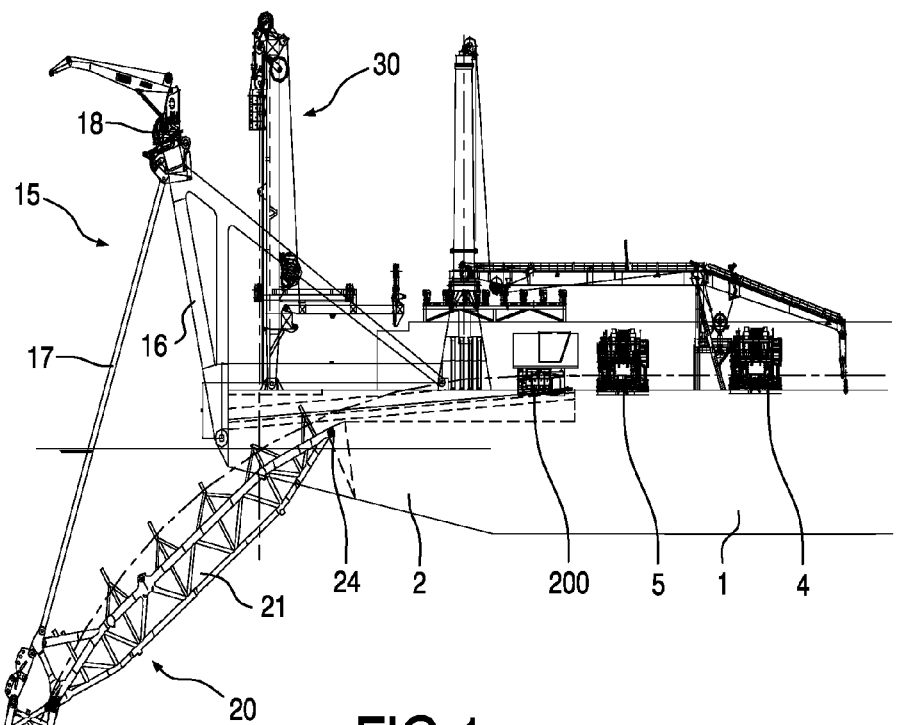
FIG. 1 shows a schematic side view, partially is see through, of a marine pipelaying vessel according to the first aspect of the invention.

The figures illustrate the stinger end of a hull 1 of a pipelaying vessel having S-lay capability. In a preferred embodiment the stinger end is the stern or aft end of the hull, but an embodiment wherein the stinger is arranged at the bow is also envisaged.

The figures illustrate that two cantilever structures 2, 3 extend at the stinger end of the hull 1, generally in longitudinal direction of the vessel, here as integral portions of the hull that lengthen the waterline of the vessel. Other embodiments of the cantilever structures, e.g. arranged at a distance above the waterline are also envisaged.

In general the cantilevers 2, 3 and the aft end of the hull centrally of the cantilevers 2, 3 delimit a U-shaped opening when seen from above, as is preferred open at the side remote from the hull. When closed at said side, the cantilevers would form a moonpool type opening which is also possible.

The vessel has an S-lay pipeline assembly installation including one or more welding stations (not show, aligned with the tensioners and arranged upstream thereof) to weld pipe sections to the end of a launched pipeline in substantially horizontal orientation as is well known in the art.

FIGS. 3-14 show the same vessel in twelve subsequent working positions, according to the first aspect of the present invention.

The figures illustrate the presence of one or more tensioners 4, 5 that are arranged downstream of the pipeline assembly installation and are embodied to support the weight of the launched pipeline 10. As is preferred, the tensioners 4, 5 are mounted on the hull to engage on a substantially horizontal section of the pipeline 10.

The figures illustrate the presence of a stinger 20 for guiding the launched pipeline 10 in a curved pipeline trajectory as is known in the art of S-lay.

The stinger 20 is pivotably connected to the stinger end of the hull such that the stinger is pivotable about a horizontal stinger pivot axis 24.

As is preferred the axis 24 is arranged such that the stinger, or at least a first stinger section 21 that is directly connected to the hull 1, can assume a vertically downward position or even a forwardly pulled position.

As is preferred the stinger 20 is composed of multiple interconnected stinger sections 21, 22, 23, preferably articulated, preferable the hinge structures between sections allowing to adjust the angle between sections.

The first stinger section 21 extends in the opening between the two cantilever structures 2, 3.

As can be seen a deck 7 of the vessel here is arranged so as to slope from the last tensioner 5 downwards to the stinger pivot connection 24.

The figures illustrate the presence of a stinger support assembly 15 for supporting the stinger 20 in a pipelay position (e.g. FIG. 3), and for allowing movement of the stinger between the pipelay position and a steep downwardly pivoted retracted position (e.g. FIG. 6) by pivoting the stinger about its stinger pivot axis 24.

In this exemplary embodiment the assembly 15 comprises a stinger support frame 16 secured to the cantilevers 2, 3, as well as stinger suspension cables 17 and one or more winches 18 (here mounted on the stinger support frame 16). The stinger support frame 16 can be embodied as an A—frame as is shown here, with legs secured at their lower ends to the cantilevers. In another embodiment the stinger support frame could be embodied as a gantry structure secured with its legs integrally to the structure of the cantilevers 2, 3.

The figures also illustrate the presence of an accessory handling J-lay tower 30 at the stinger end of the hull. This tower 30 is adapted for supporting an accessory 40 to be connected to the pipeline 10 and for launching in J-lay mode said pipeline 10 with the accessory 40 connected thereto along a J-lay firing line 31 (see e.g. FIG. 6). As is common this J-lay firing line 31 is vertical or near vertical.

As is illustrated the stinger 20 is in the retracted position thereof away from the J-lay firing line 31 so as to not interfere with the lowering of the pipeline 10 and accessory 40 along said J-lay firing line.

The figures illustrate the presence of a displaceable hang off clamp 200 for supporting the weight of the launched pipeline 10 when disconnected from the tensioners 4, 5.

This clamp is preferably embodied as a friction clamp, although a collar clamp, or combined collar and friction clamp, is also possible.

Figure 6:
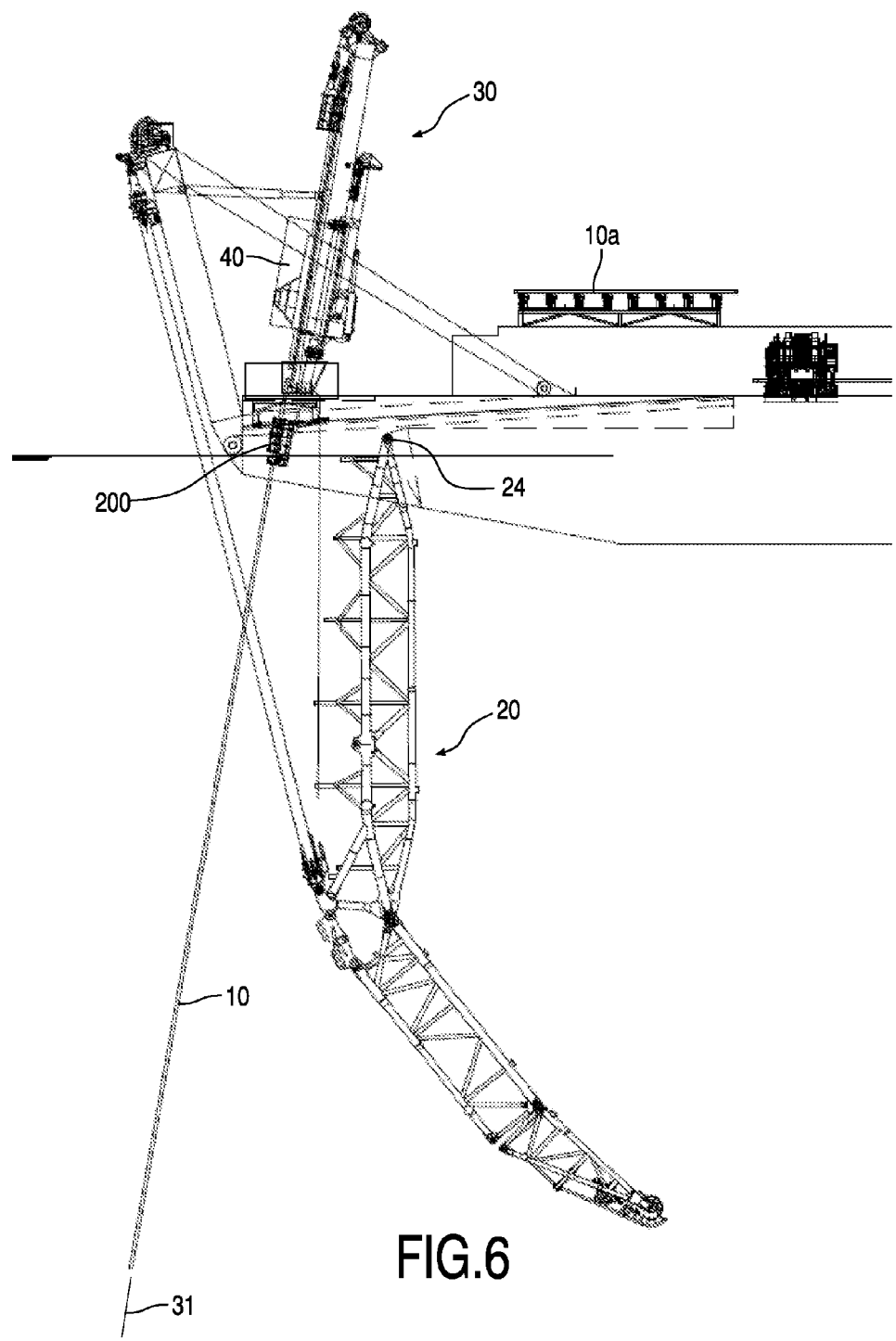
FIG. 6 shows a schematic side view, partially is see through, of a marine pipelaying vessel according of FIG. 3 in a fourth working position.

The clamp 200 is displaceable while supporting the weight of the launched pipeline between a first position (see e.g. FIG. 1) and a second position (see e.g. FIG. 6).

In the first position the hang off clamp 200 can be clamped on the pipeline 10 downstream of the one or more tensioners during S-lay to allow disconnection of the pipeline from the tensioners. For example said first position is within 10 meters downstream of the last tensioner 5.

In the second position the clamp 200 is positioned in the J-lay firing line 31 of the accessory handling J-lay tower 30 such that the pipeline 10 supported by the hang off clamp can be aligned with the accessory 40 supported by the accessory handling J-lay tower 30 and can be connected thereto (see e.g. FIG. 6).

The J-lay tower 30 allows the pipeline 10 and the connected accessory 40 to be laid in J-lay mode while connecting further pipe sections 10a to the pipeline 10 above the accessory 40 or using A&R at least until the accessory 40 has been lowered past below the retracted stinger 20 (see e.g. FIG. 13), at least past a first section 21 of the stinger, preferably until fully below the stinger 20.

The J-lay tower 30 here is tiltable about a horizontal tower pivot axis 32, parallel to stinger pivot axis 24. In this way, the J-lay laying or departure angle of the pipeline 10 with the accessory 40 is adjustable, which is particularly advantageous to allow for different water depths.

The accessory 40 is provided to the J-lay firing line side of the accessory handling J-lay tower 30.

As will be explained in more detail the vessel comprises a displaceable hang off clamp frame in which the hang off clamp 200 is supported. As such, it is possible for the hang off clamp frame to be displaceable substantially horizontally between the first and second position, while the hang off clamp is tiltably supported about a horizontal clamp tilt axis. This is advantageous as the hang off clamp in the first position clamps the pipeline while the pipeline extends essentially horizontally, while in the second position the pipeline supported by the hang off clamp extends according to the J-lay angle to be aligned with and connected to the accessory. Hence, the hang off clamp is allowed to tilt between an essentially horizontal position in the first position of the hang off clamp and an essentially vertical position in the second position of the hang off clamp. It is preferred that the tilting of the hang off clamp is controlled.

As will be explained in more detail the hang off clamp frame supports a working station comprising a floor above the hang off clamp 200, the working station providing a shielded environment for welding the accessory to the pipeline. The working station is preferably embodied as a cabin comprising a ceiling, multiple walls and a floor, to establish the shielded environment.

In an alternative not shown embodiment, the working station is provided above the hang off clamp, independent of the hang off clamp frame.

The vessel is provided with two parallel rails supporting the hang off clamp frame between the first and second position. These rails here extend over both cantilevers 2, 3 so as to extend beyond the stinger pivot axis 24.

Figures 17, 18:
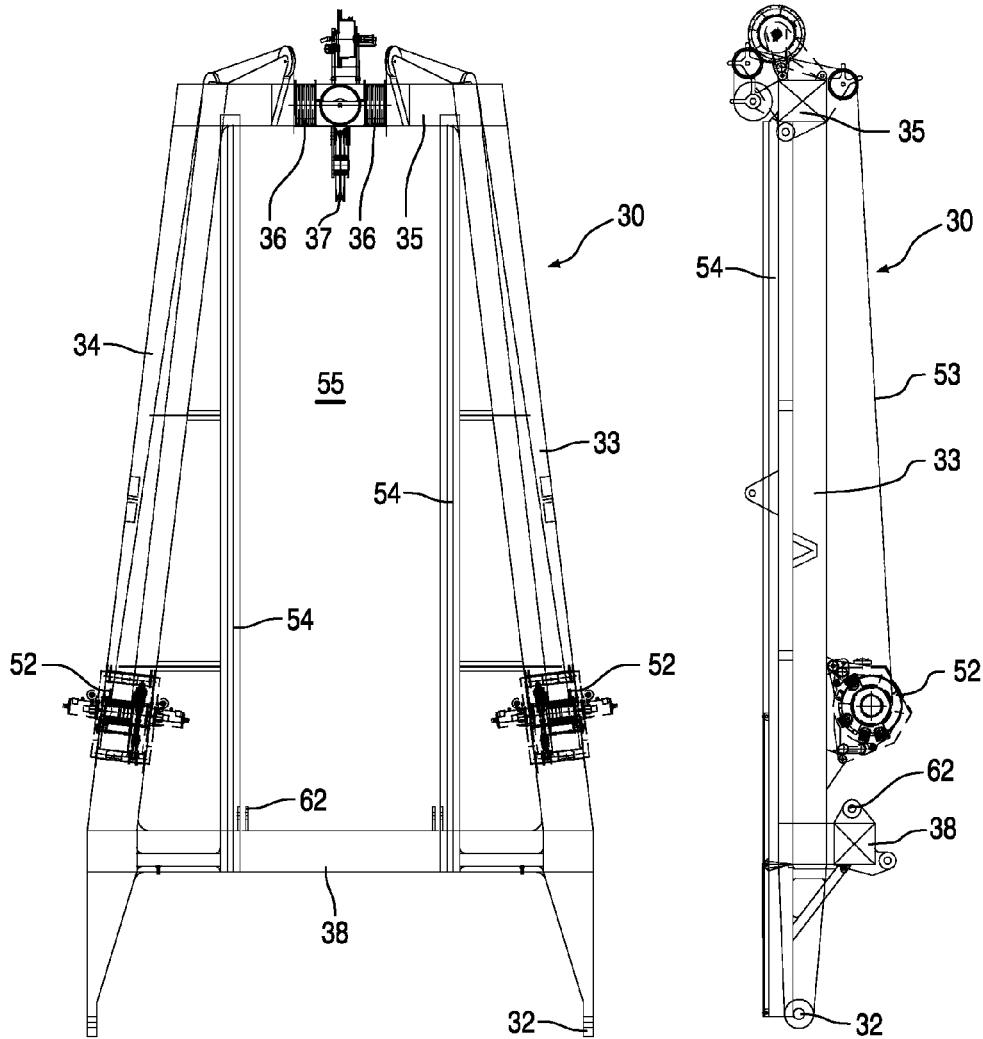
FIG. 17 shows a schematic frontal view of an A-frame of a J-lay tower of a marine pipelaying vessel according to the invention.
FIG. 18 shows a schematic side view of the A-frame of FIG. 17.
Figure 19:
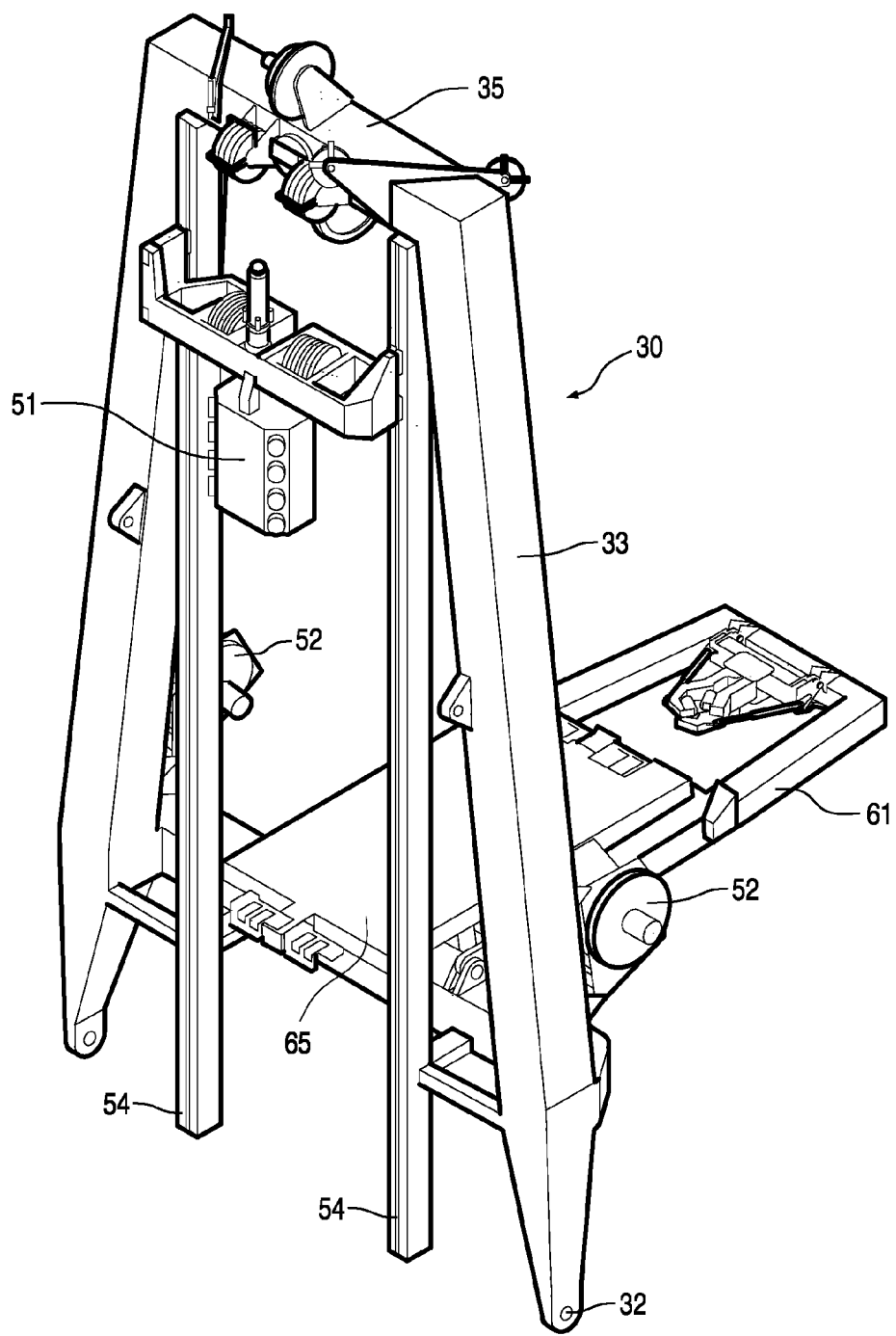
FIG. 19 shows a schematic perspective view of a J-lay tower of a marine pipelaying vessel according to the invention, in a first working position.
Figure 20:
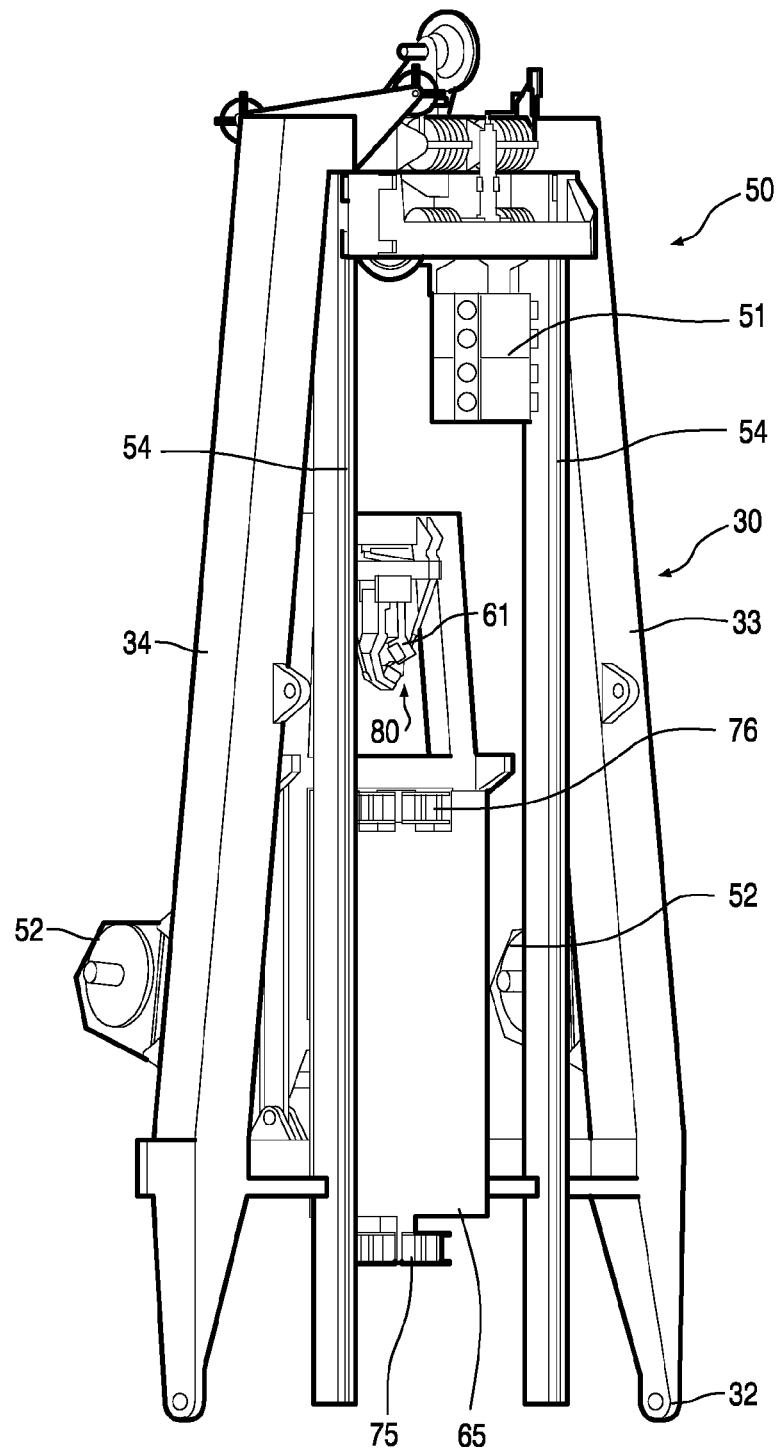
FIG. 20 shows a schematic perspective view of the J-lay tower of FIG. 19 in a second working position.
Figure 21:
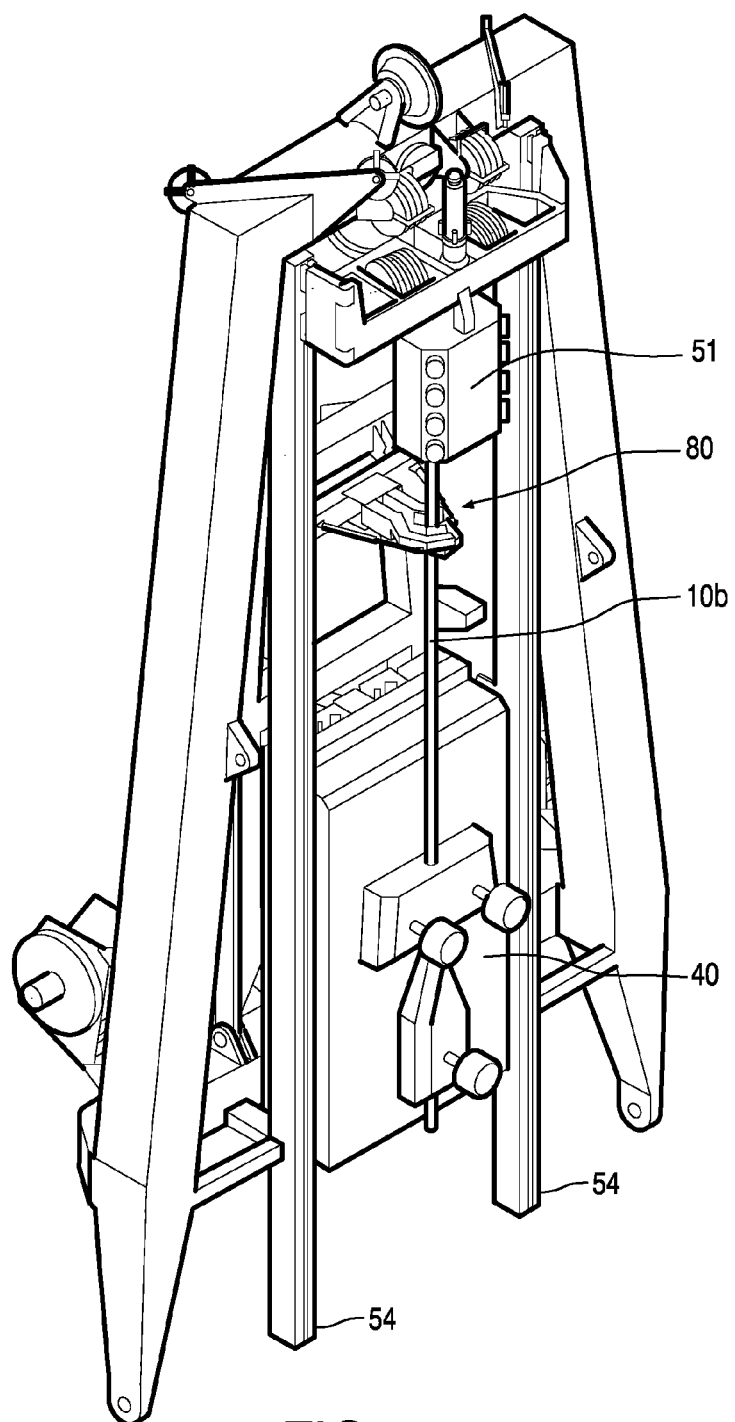
FIG. 21 shows a schematic perspective view of the J-lay tower of FIG. 20 supporting an accessory.
Figure 22:
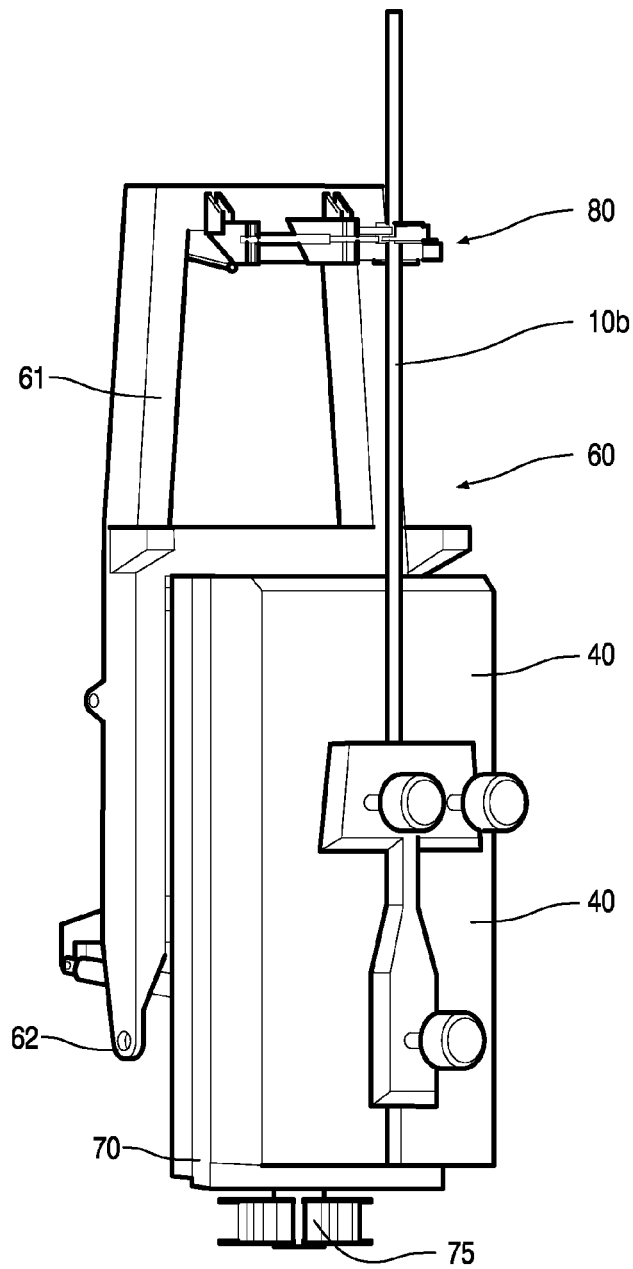
FIG. 22 shows part of the J-lay tower of FIG. 21 supporting an accessory.

As visible in FIG. 17, the tower 30 is provided with a vertically movable travelling block 50 having a head clamp 51, here a friction clamp, connectable to an upper end of the pipeline 10. The travelling block 50 is connected via one or more cables 53 to one or more winches 52 to allow for controlled vertical motion of the head clamp and the pipeline suspended from the head clamp.

The tower is provided with parallel vertical guide rails 54 for the travelling block 50 with the head clamp.

As indicated above, FIGS. 3-14 show the same vessel in twelve subsequent working positions, according to the first aspect of the present invention.

Figure 3:
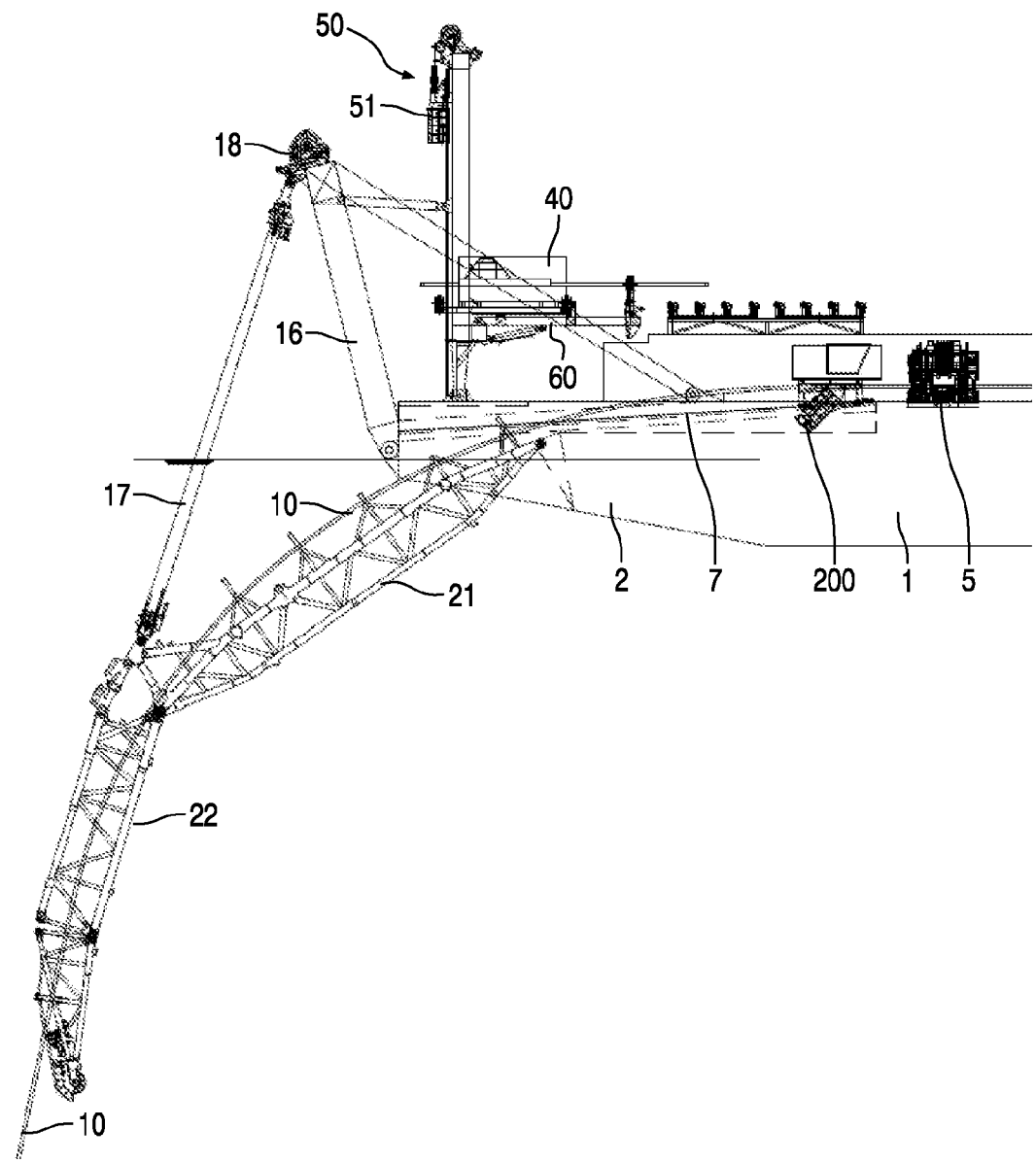
FIG. 3 shows a schematic side view, partially is see through, of a marine pipelaying vessel according to the first aspect of the invention in a first working position.

In FIG. 3 the pipelaying vessel is shown in an S-lay mode. A pipeline 10 is lowered via tensioner 5 and the stinger 20 into the sea. The stinger support assembly 15 supports the stinger 20 in a pipelay position. The hang off clamp 200 is in a first position in which the hang off clamp can be clamped on the pipeline 10 downstream of the tensioners, but has not yet been brought in such a clamping position. The hang off clamp 200 of this embodiment is tiltable, and now extends in a non-active position. The travelling block 50 with head clamp 51 is in an upper position in the accessory handling J-lay tower 30. The accessory 40 is positioned on the accessory loader device 60.

Figure 4:
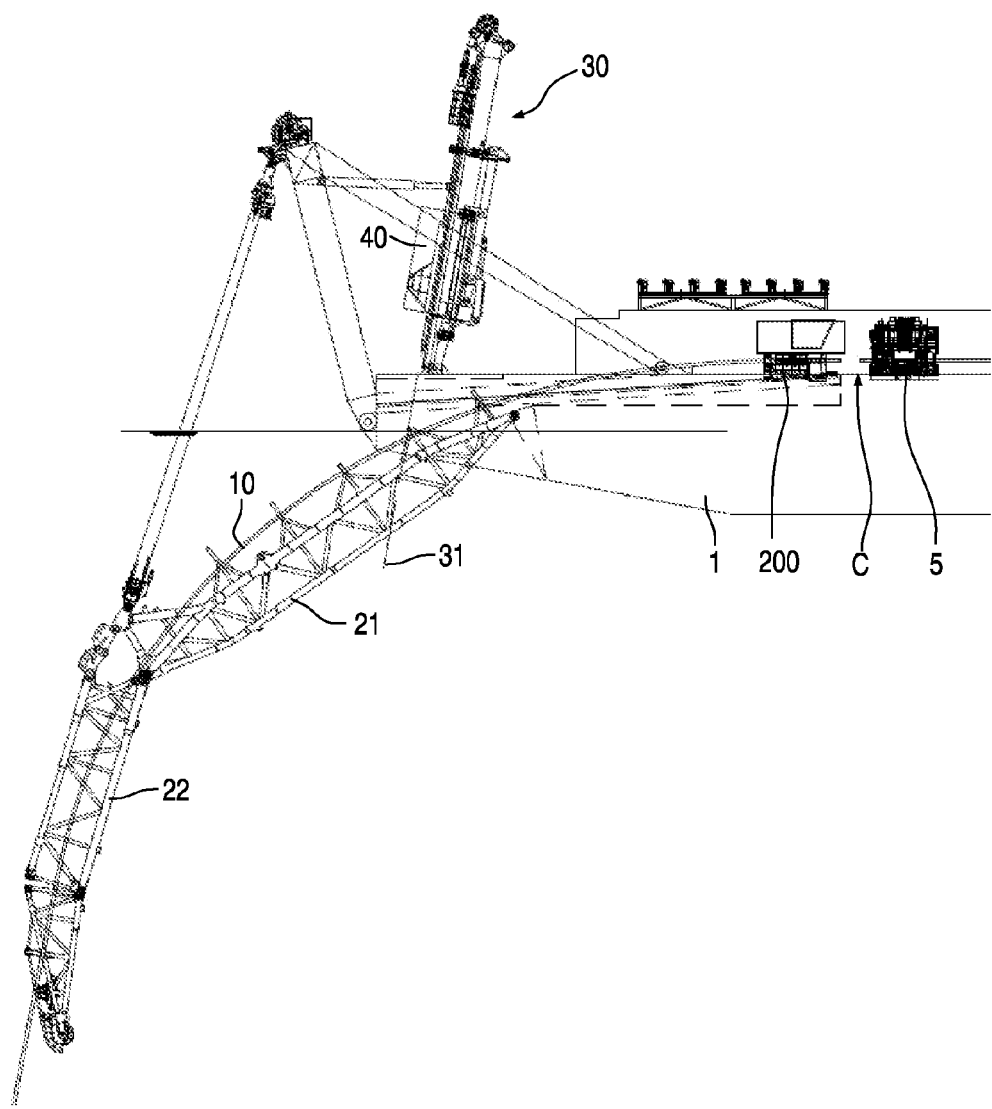
FIG. 4 shows a schematic side view, partially is see through, of a marine pipelaying vessel according of FIG. 3 in a second working position.

In FIG. 4 the hang off clamp 200 is clamped on the pipeline 10 downstream of the one or more tensioners during S-lay to allow disconnection of the pipeline from the tensioners. For example said first position is within 10 meters downstream of the last tensioner 5. The S-lay pipelaying process is interrupted by cutting the launched pipeline 10 between the tensioner 5 and the hang off clamp 200 at position C. This cutting has taken place only after the hang off clamp 200 has tilted to an essentially horizontal position and has been brought in such a clamping position. The hang off clamp 200 now supports the weight of the launched pipeline.

In FIG. 4 the accessory 40 has been loaded with the aid of the accessory loader device 60 into the accessory handling J-lay tower 30 at the stinger end of the hull. This tower 30 is adapted for supporting an accessory 40 to be connected to the pipeline 10. In FIG. 4, the J-lay tower has tilted to assume a J-lay position having a tilted J-lay firing line 31. As is common this J-lay firing line 31 is vertical or near vertical. A pipe section 10b formed integral with the accessory 40 is clamped by the head clamp 51 in an upper position of the J-lay tower 30. The stinger is still supported in its pipelay position by the stinger support assembly 15. It is noted that this preparation of launching an accessory can be performed at any time during S-lay pipelaying, before interrupting the launched pipeline.

Figure 5:
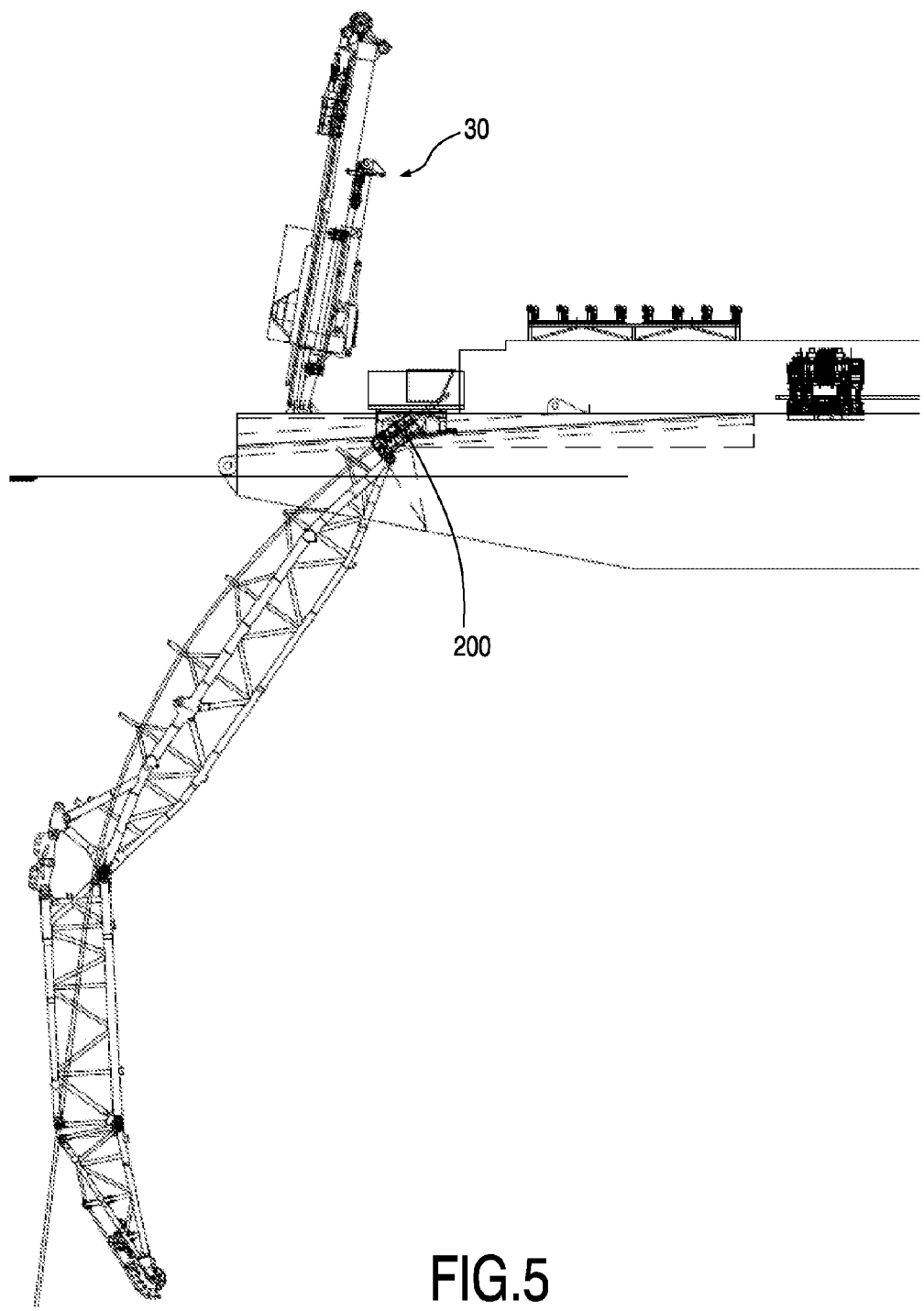
FIG. 5 shows a schematic side view, partially is see through, of a marine pipelaying vessel according of FIG. 3 in a third working position.

In FIG. 5 the hang off clamp 200 with the end of the launched pipeline has moved from the first position downstream of the tensioners in the direction of the second position in the J-lay firing line of the accessory handling J-lay tower. Simultaneous with this horizontal translational movement, the hang off clamp 200 has tilted from a horizontal position in which the pipeline adjacent the tensioners was clamped (FIG. 4) to a tilted position, in the direction of the J-lay firing line.

For clarity reasons the stinger support assembly 15 has been omitted in FIG. 5, but this stinger support assembly does allow movement of the stinger between the pipelay position of FIGS. 3 and 4 in the direction of a steep downwardly pivoted retracted position. In FIG. 5 the stinger has pivoted a very small amount, to prevent the build up of too large stress accumulations in the launched pipeline, between the hang off clamp and the stinger.

In FIG. 6 the stinger 20 has been allowed to pivot about its stinger pivot axis 24 to the steep downwardly pivoted retracted position. This process has been guided by the stinger support assembly 15. As is illustrated the stinger 20 is in the retracted position thereof away from the J-lay firing line 31 so as to not interfere with the lowering of the pipeline 10 and accessory 40 along said J-lay firing line.

In FIG. 6 it is visible that the hang off clamp 200 has moved further, while supporting the weight of the launched pipeline, from the first position (FIGS. 1 and 2) to the second position in the J-lay firing line 31 of the accessory handling J-lay tower 30. Simultaneously, the hang off clamp has tilted further from the horizontal position to the direction of the J-lay firing line. In FIG. 6, the hang off clamp is in such a position that the pipeline 10 supported by the hang off clamp can be aligned with the accessory 40 supported by the accessory handling J-lay tower 30 and can be connected thereto.

It is also visible in FIG. 6 that a further pipe section 10a is positioned in the vicinity of the accessory loader device 60.

In the situation shown in FIG. 6 the accessory 40 is connected to the launched pipeline in the working station above the hang off clamp 200. After finishing this connection, the accessory with the launched pipeline is being held by the head clamp 51 if the J-lay tower, allowing the hang off clamp with the working station to move out of the J-lay firing line, as is visible in FIG. 7. This is to allow the passage of the accessory 40.

Figure 7:
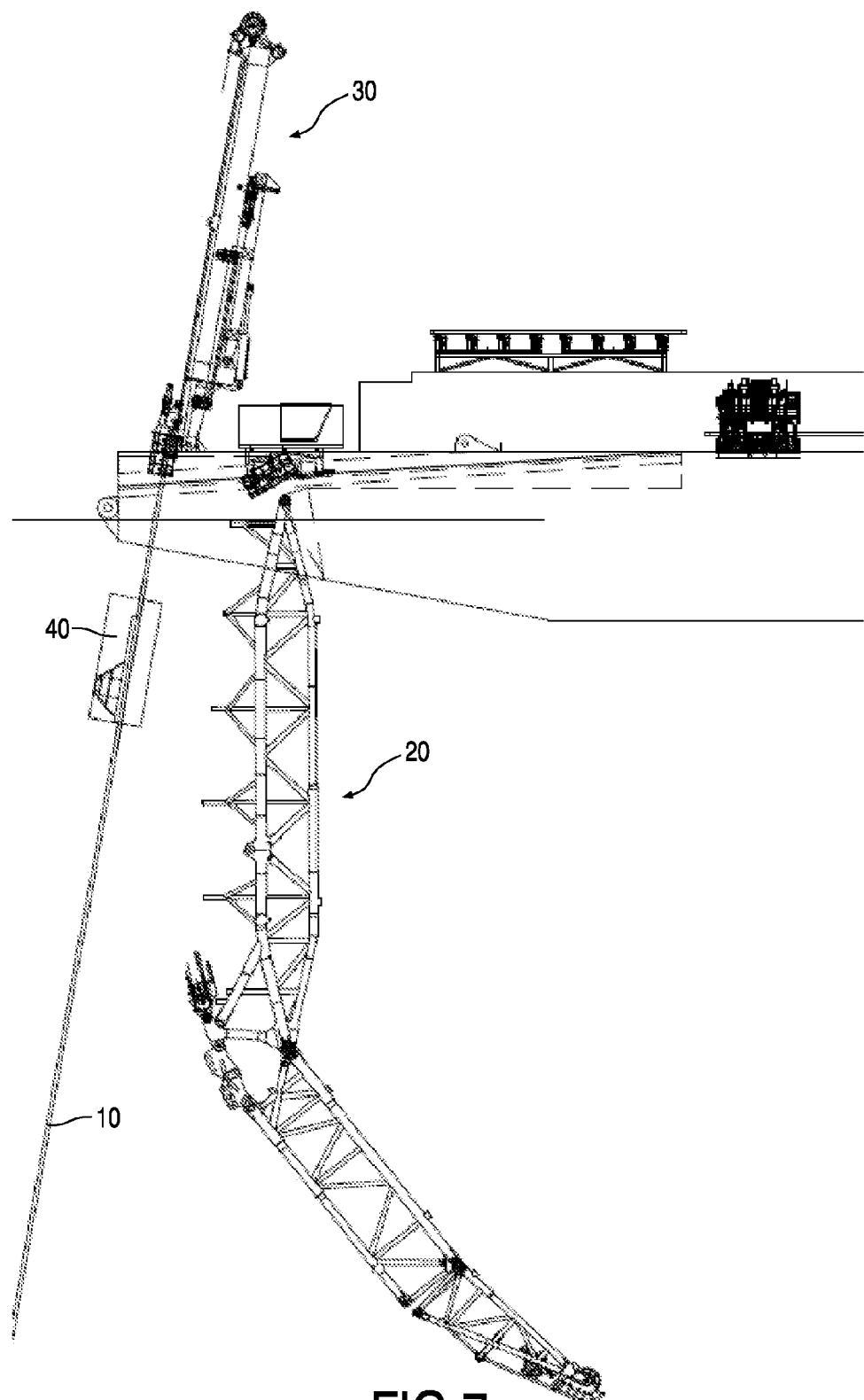
FIG. 7 shows a schematic side view, partially is see through, of a marine pipelaying vessel according of FIG. 3 in a fifth working position.

In FIG. 7, it is visible that the pipeline 10 with the accessory 40 connected thereto has been lowered by the J-lay tower 30 along the J-lay firing line. The head clamp 51, clamping an upper end of the pipe section 10b integral with the accessory and as such supporting the launched pipeline, has moved to a lowered position within the J-lay tower.

For clarity reasons the stinger support assembly 15 has been omitted in FIGS. 7-14. However, it is evident that the stinger support assembly supports the stinger in the steep downwardly pivoted retracted position in FIGS. 7-13, and has allowed movement of the stinger from the steep downwardly pivoted retracted position back to the pipelay position in FIG. 14.

Figure 8:
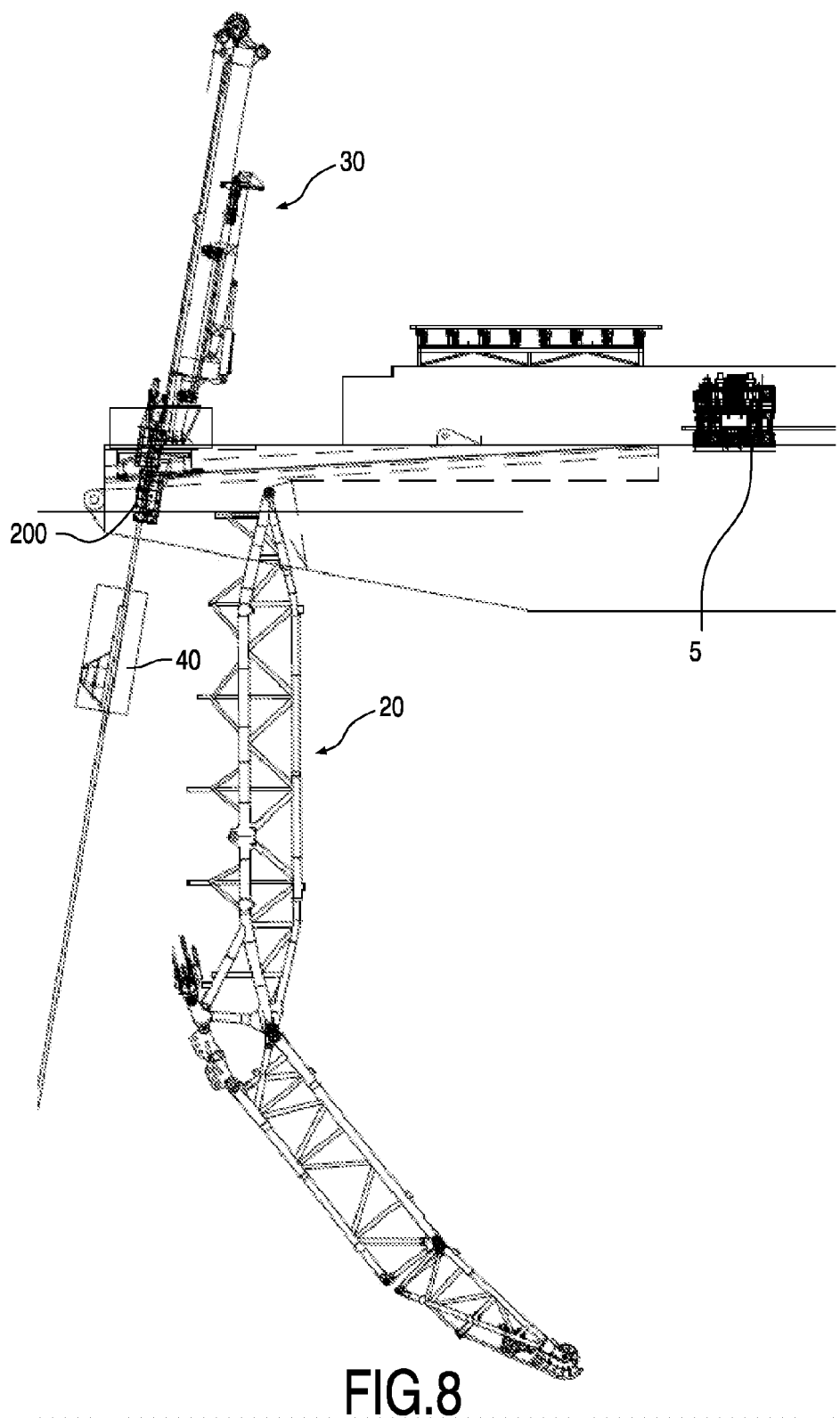
FIG. 8 shows a schematic side view, partially is see through, of a marine pipelaying vessel according of FIG. 3 in a sixth working position.
Figure 9:
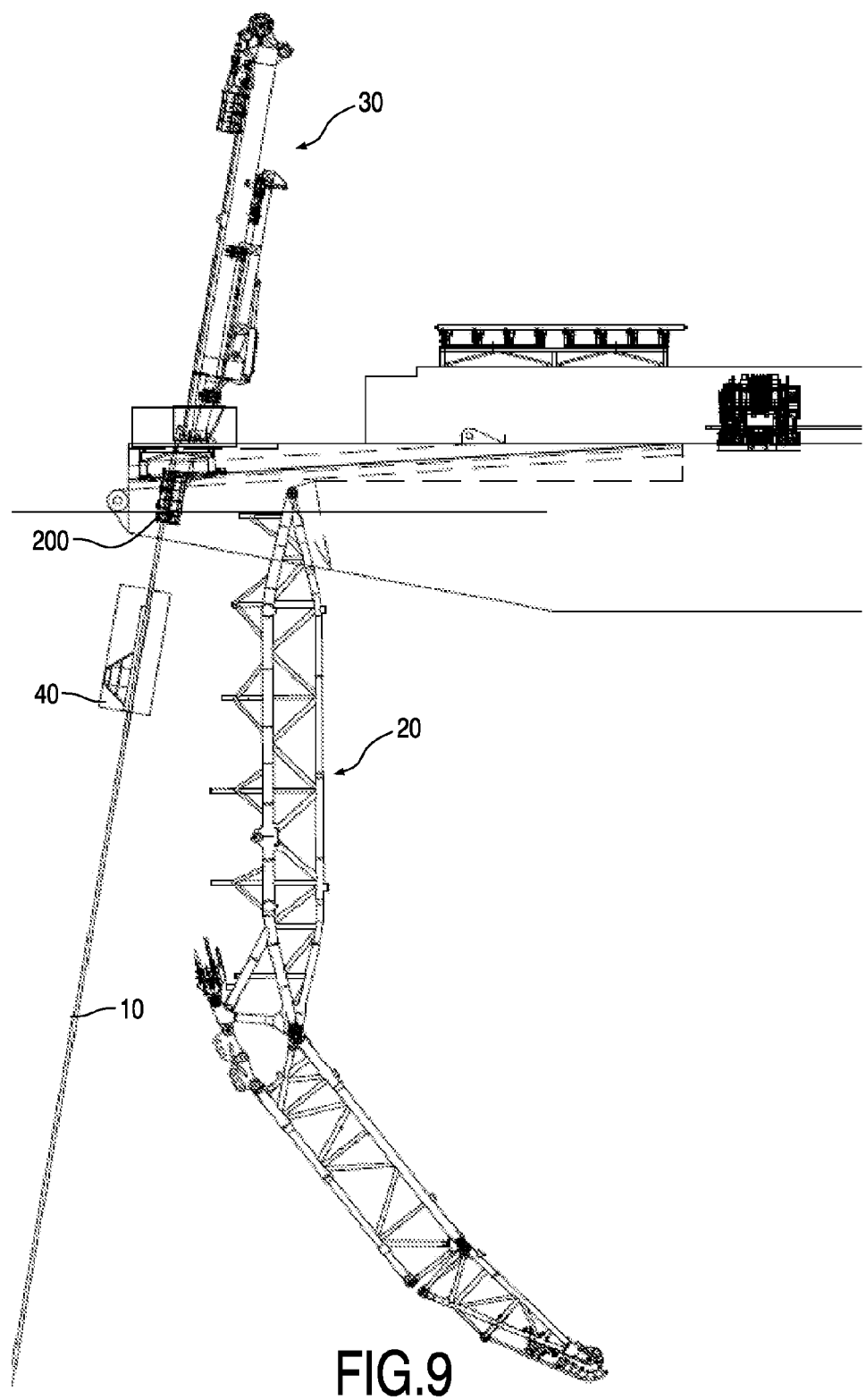
FIG. 9 shows a schematic side view, partially is see through, of a marine pipelaying vessel according of FIG. 3 in a seventh working position.

In FIG. 8, the hang off clamp has moved back from its position outside the J-lay firing line as visible in FIG. 7 to its position in the J-lay firing line, similar to the position shown in FIG. 6. In this position the hang off clamp 200 engages on the pipe section 10b integral with the accessory 40, and thus supporting the launched pipeline with the accessory. This situation allows the head clamp 51 of the J-lay tower to disconnect from the pipe section 10b and move back to an upper position in the J-lay tower 30, as is visible in FIG. 9.

Figure 10:
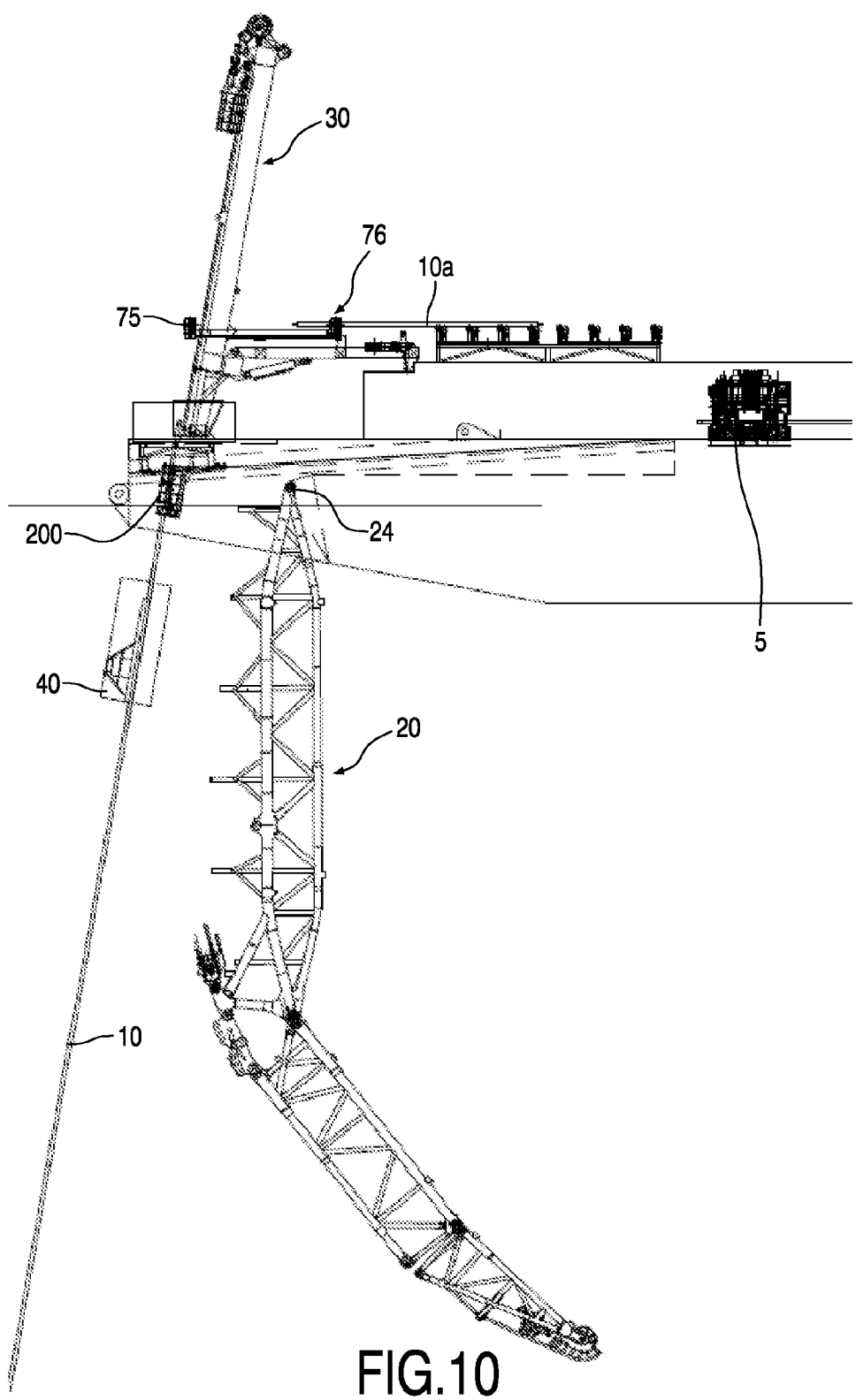
FIG. 10 shows a schematic side view, partially is see through, of a marine pipelaying vessel according of FIG. 3 in an eighth working position.
Figure 11:
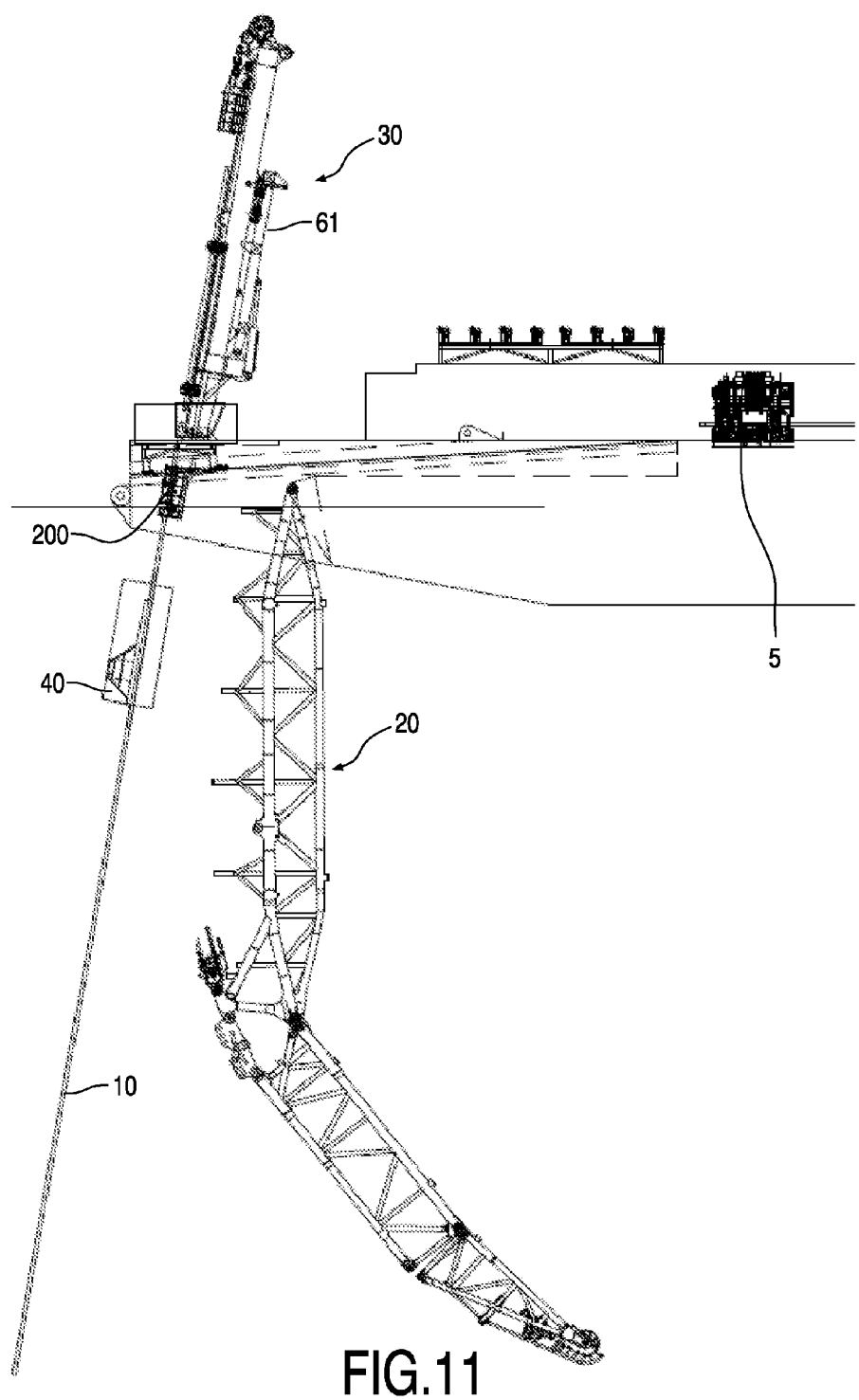
FIG. 11 shows a schematic side view, partially is see through, of a marine pipelaying vessel according of FIG. 3 in a ninth working position.

Now the J-lay tower is ready for lowering pipe sections, such as pipe section 10a. In FIG. 10 it is visible that the accessory loader device 60 grips pipe section 10a and brings the pipe section into the J-lay tower in the firing line, as visible in FIG. 11.

Figure 12:
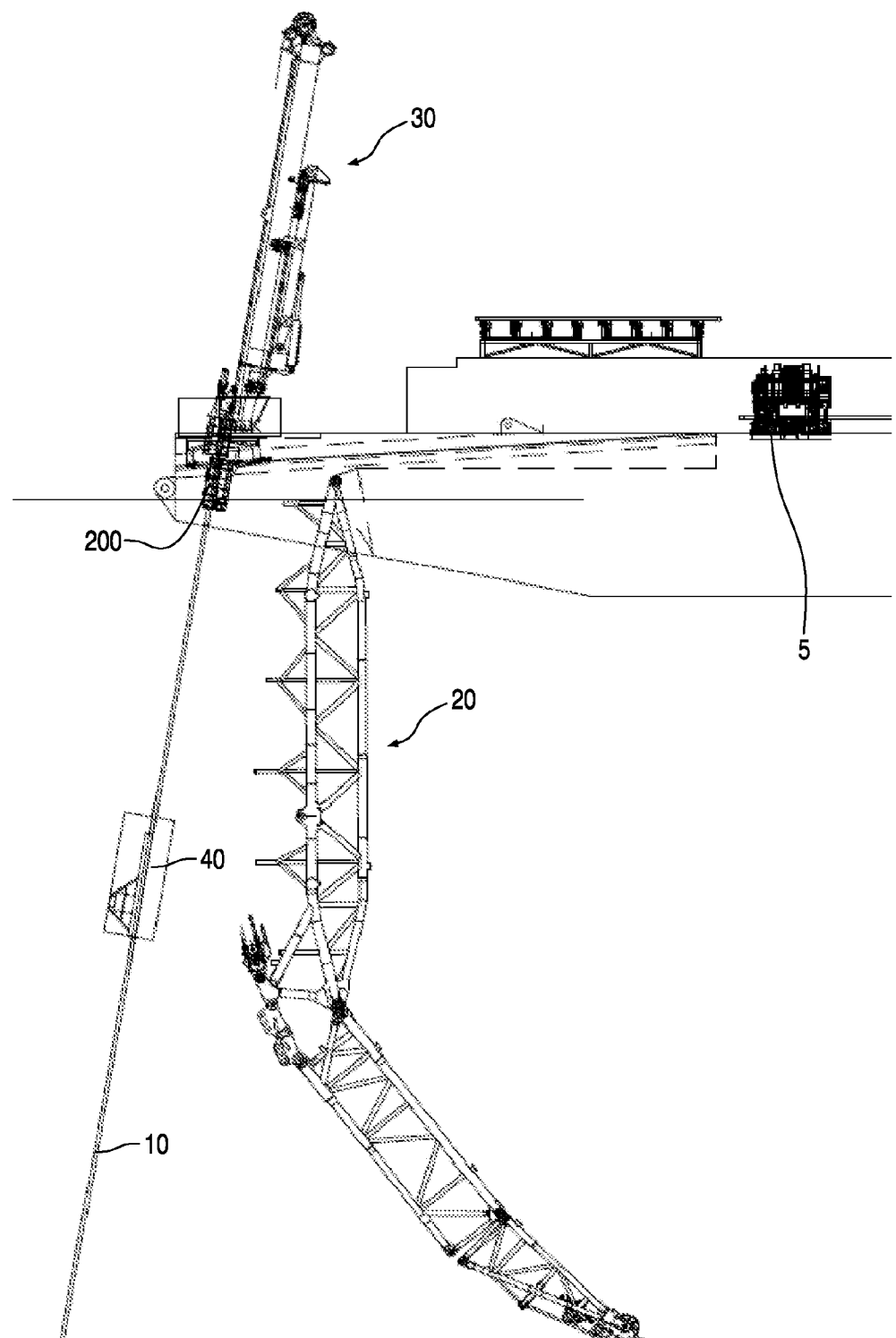
FIG. 12 shows a schematic side view, partially is see through, of a marine pipelaying vessel according of FIG. 3 in a tenth working position.
Figure 13:
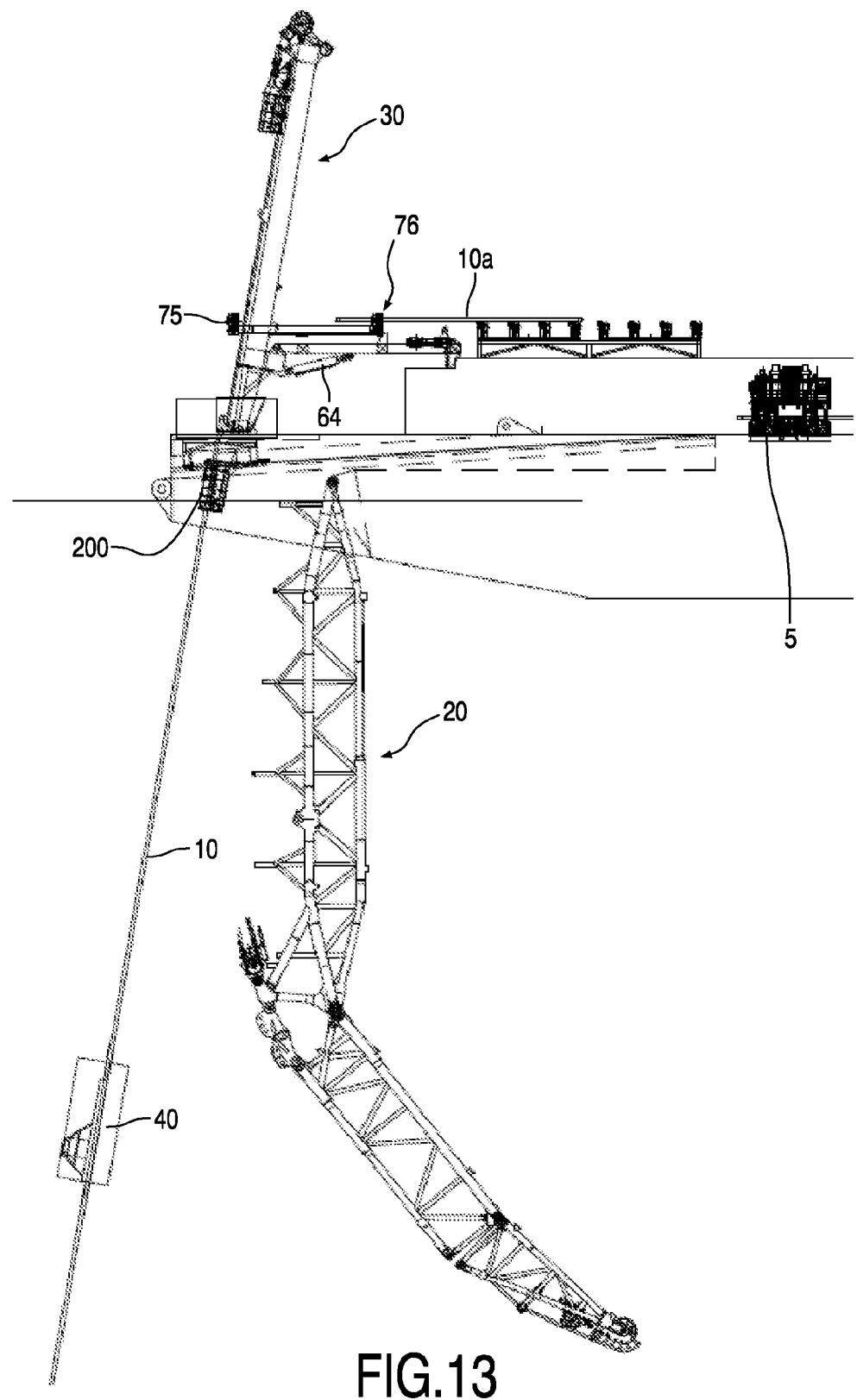
FIG. 13 shows a schematic side view, partially is see through, of a marine pipelaying vessel according of FIG. 3 in an eleventh working position.

In the working station above the hang off clamp 200 the pipe section 10a is welded onto pipe section 10b, formed integral with the accessory 40. The head clamp 51 is allowed to clamp an upper end of pipe section 10a, thereby being able to support the launched pipeline and the connected accessory, allowing the hang off clamp 200 to open. The head clamp 51 can now lower the pipe section 10a, connected to the accessory 40, which is connected to the pipeline 10. This lowered position is visible in FIG. 12. In FIG. 12, it is also visible that another pipe section is positioned adjacent the accessory loader device 60, to be welded on top of the launched pipe section, accessory and pipeline (FIG. 13). As such, the J-lay tower 30 is able to lay pipeline 10 and the connected accessory 40 in J-lay mode, while connecting further pipe sections 10a to the pipeline above the accessory 40.

As pipelaying in J-lay mode is significantly slower than pipelaying in S-lay mode, this J-lay mode is generally only allowed to occur until the accessory 40 has been lowered past below the retracted stinger 20 (see e.g. FIG. 13), at least past a first section 21 of the stinger, preferably until fully below the stinger 20.

Figure 14:
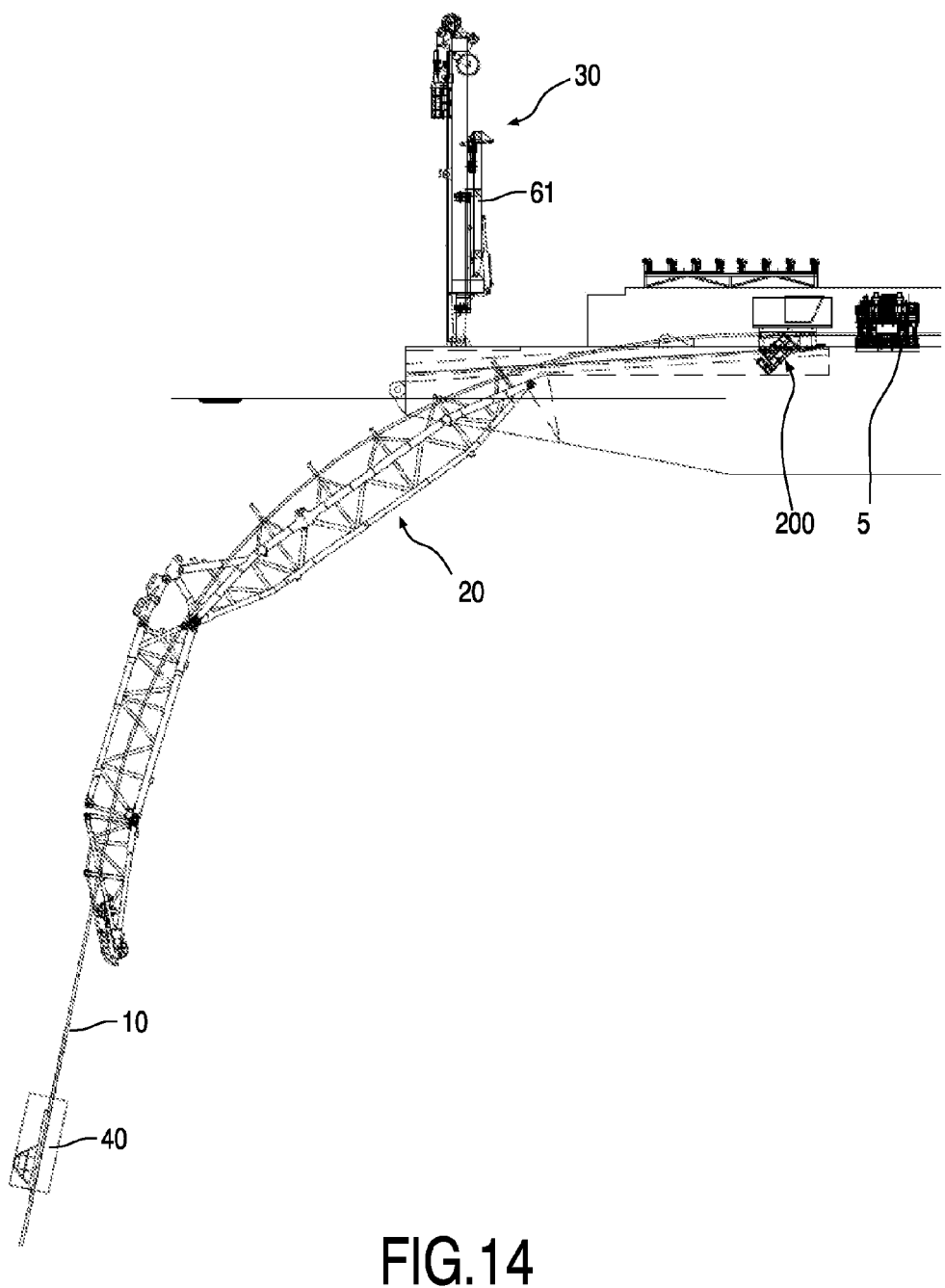
FIG. 14 shows a schematic side view, partially is see through, of a marine pipelaying vessel according of FIG. 3 in a twelfth working position.

In FIG. 14, the stinger has been allowed to move back from the steep downwardly pivoted retracted position back to the pipelay position. Also the hang off clamp has moved back to the first position downstream of the tensioner and the J-lay tower has moved back to the vertical position. In fact, FIG. 14 corresponds to the situation of FIG. 3 in which the vessel is allowed to pipelay in S-lay mode, with the only difference that the accessory 40 has now been integrated in the pipeline.

It is noted that in a not shown situation, accessory 40 is an end accessory to be connected to the end of the launched pipeline. In this situation, it is not necessary to connect further pipe sections to the accessory but can the accessory be lowered using an A&R cable.

Figure 15:
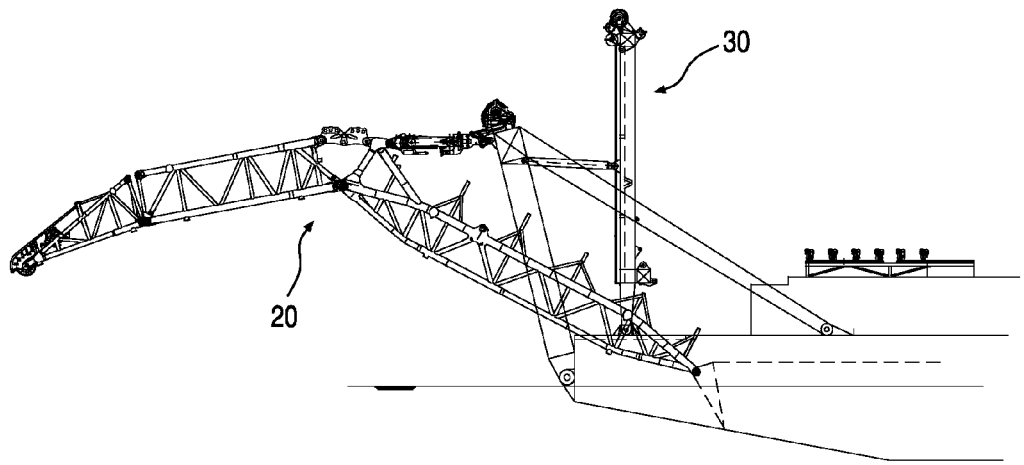
FIG. 15 shows a schematic side view of a marine pipelaying vessel according to the invention with a stinger in a transport position.

In FIG. 15 the marine pipelaying vessel is shown with the stinger in an elevated transport position, in which the stinger is elevated by the stinger support assembly.

Figure 16:
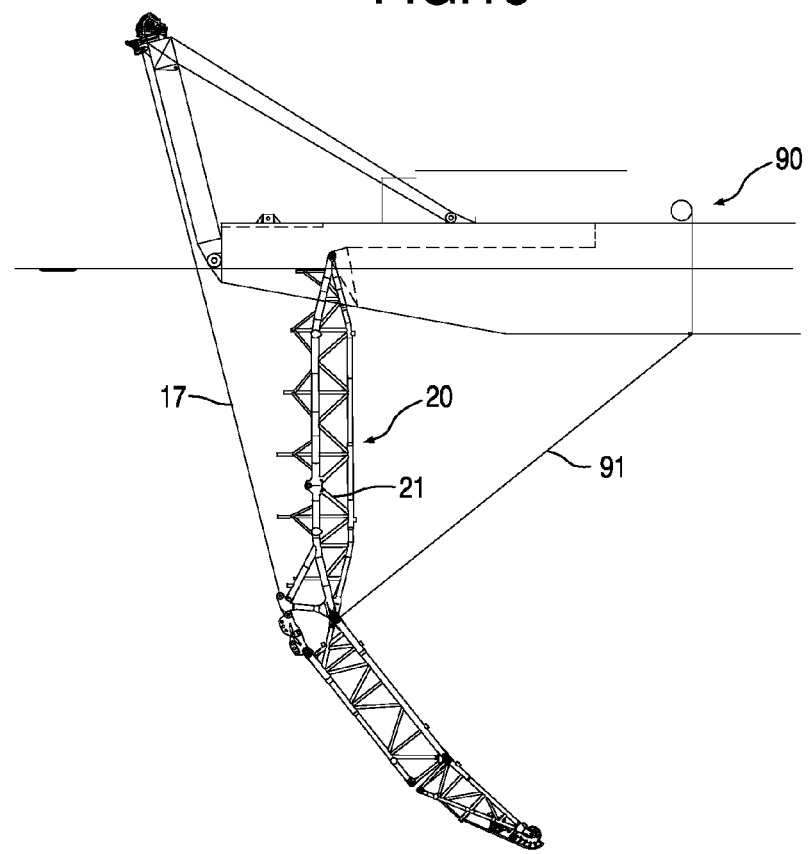
FIG. 16 shows a schematic side view of a marine pipelaying vessel according to the invention, with a stinger in a retracted position.

FIG. 16 illustrates an embodiment of a stinger securing system for securing the stinger 20 in the retracted position. Here the stinger securing means comprises a winch 90 and a cable 91 connectable to the stinger remote from its pivot axis 24, here at the end of first section 21. This allows to pull the steep downwardly retracted stinger 20 further away from the J-lay firing line, here in direction towards the bow of the vessel.

Alternative securing systems (not shown) include the use of cylinders and/or adjusters.

As is preferred—in use—the stinger 20 is secured in its retracted position by simultaneous exerting opposite directed forces thereon by means of the stinger securing system 90, 91 and by the stinger support assembly, here by tensioning cable 17.

As visible in FIG. 17, a passage opening 55 for a pipeline accessory 40 is present between said vertical guide rails 54 allowing to pass the accessory by means of an accessory loader device 60 from a receiving position at one side of the tower 30 to the J-lay firing line position at the other side of the tower 30. Here the horizontal distance between guide rails 54 is 8 meters.

The tower comprises a load bearing tower structure having two legs 33, 34, each pivotally connected at a lower end thereof about horizontal tower tilt axis 32 to an associated cantilever structure 2, 3.

The legs are connected at upper ends thereof by a horizontal top beam 35, said beam 35 supporting sheaves 36 guiding one or more cables supporting a travelling block 50 with a head clamp connectable to an upper end of the pipeline. The beam 35 also supports A&R sheave 37.

The tower structure comprises a horizontal lower beam 38 connecting the legs 33, 34 near lower ends thereof, wherein a passage opening 55 for a pipeline accessory 40 is present between said top beam and said lower beam. The vertical height between the horizontal beams is preferably at least 10 meters.

The tower 30 is provided with an accessory loader device 60, best seen in FIGS. 19-24.

The accessory loader device 60 is provided with a line-up tool adapted to align the accessory with the launched pipeline.

The accessory loader device 60 comprises a main loader frame 61 that is pivotally (via horizontal pivot axis 62) connected to the J-lay tower 30, here to a lower beam 33, 34 as is preferred, so as to be pivotable by an associated pivoting device (here hydraulic actuator 64) between a substantially horizontal receiving position and a position aligned with the J-lay firing line of the tower 30.

Figure 24:
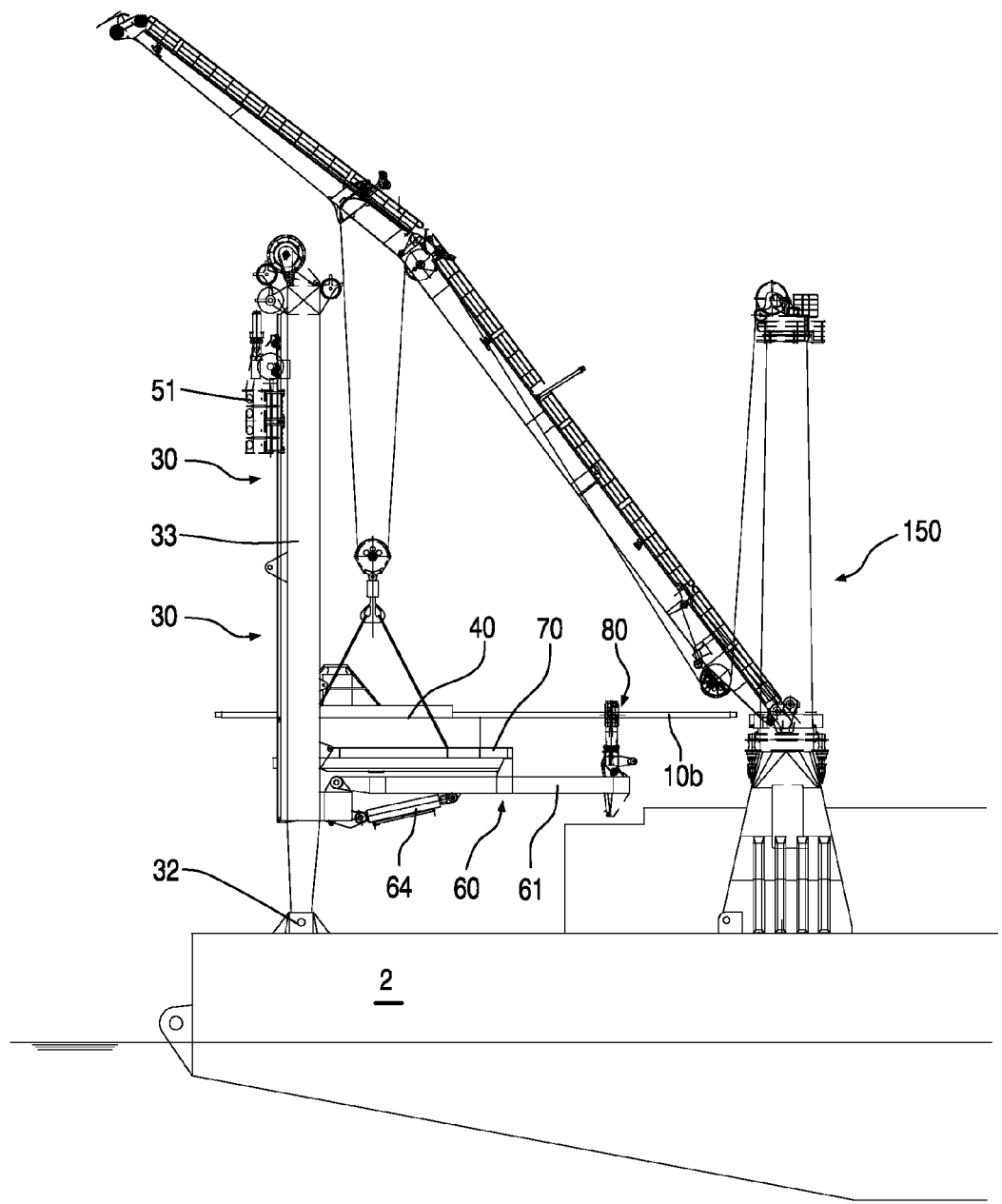
FIG. 24 shows a perspective side view of the J-lay tower of FIG. 19, in a first working position supporting an accessory.

The vessel here has a crane 150 allowing to lift an accessory 40 and place it on the loader device 60 with the main loader frame 61 in horizontal position, see e.g. FIG. 24.

The accessory loader device 60 includes a loader subframe 65 adapted to be engaged with and retain thereon the accessory 40. The loader subframe 65 is supported movably on a main loader frame of the loader device 60 to allow for line-up motion of retained accessory in one or more directions in order to align the accessory with the launched pipeline.

One or more actuators, here three actuators (one not shown) 67, 68, are provided between said main loader frame and said loader subframe adapted to cause said line-up motion, e.g. allow for angular motion about at least two perpendicular axes and/or translation along one or more axis.

The accessory 40 to be handled by the accessory loader device 60 is provided with a standard accessory handling frame 70, preferably of uniform principal dimensions to allow for efficient handling of multiple accessories on board of the pipelaying vessel. The standard accessory handling frame 70 is releasably connectable to the loader subframe 65, e.g. by releasable fastening means adapted to temporarily fasten the accessory handling frame on the loader subframe.

Figure 23:
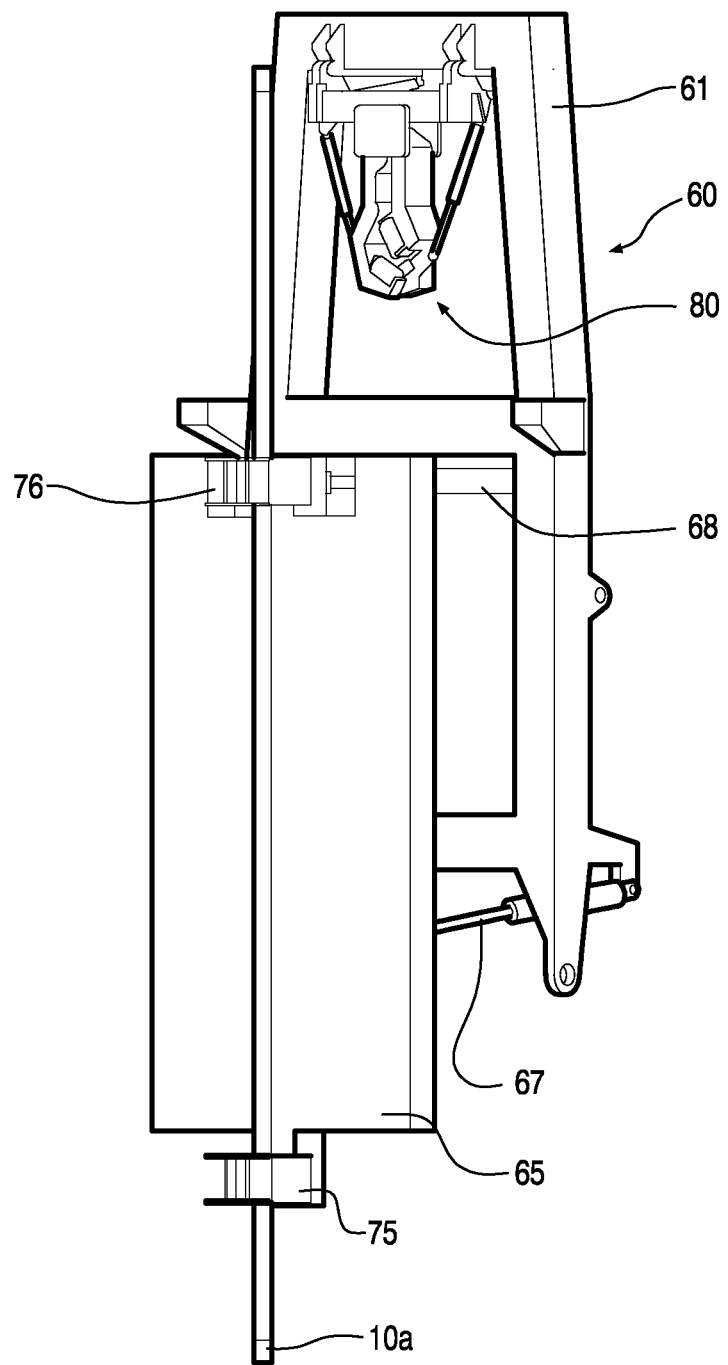
FIG. 23 shows part of the J-lay tower of FIG. 21 supporting a pipeline.

It is illustrated that the loader subframe 65 is provided with one or more pipe section grippers 75, 76, here two vertically spaced apart pipe section grippers, said pipe grippers being adapted to grip and retain a pipe section 10a to be connected to the launched pipeline in J-lay mode (see FIG. 23).

The one or more pipe section grippers 75, 76 are movable between a deployed position wherein the one or more pipe section grippers extend forward of a support face 65a of the loader subframe 65 and a retracted position wherein the one or more grippers are retracted with respect to said support face (see FIGS. 29, 30).

Figure 31:
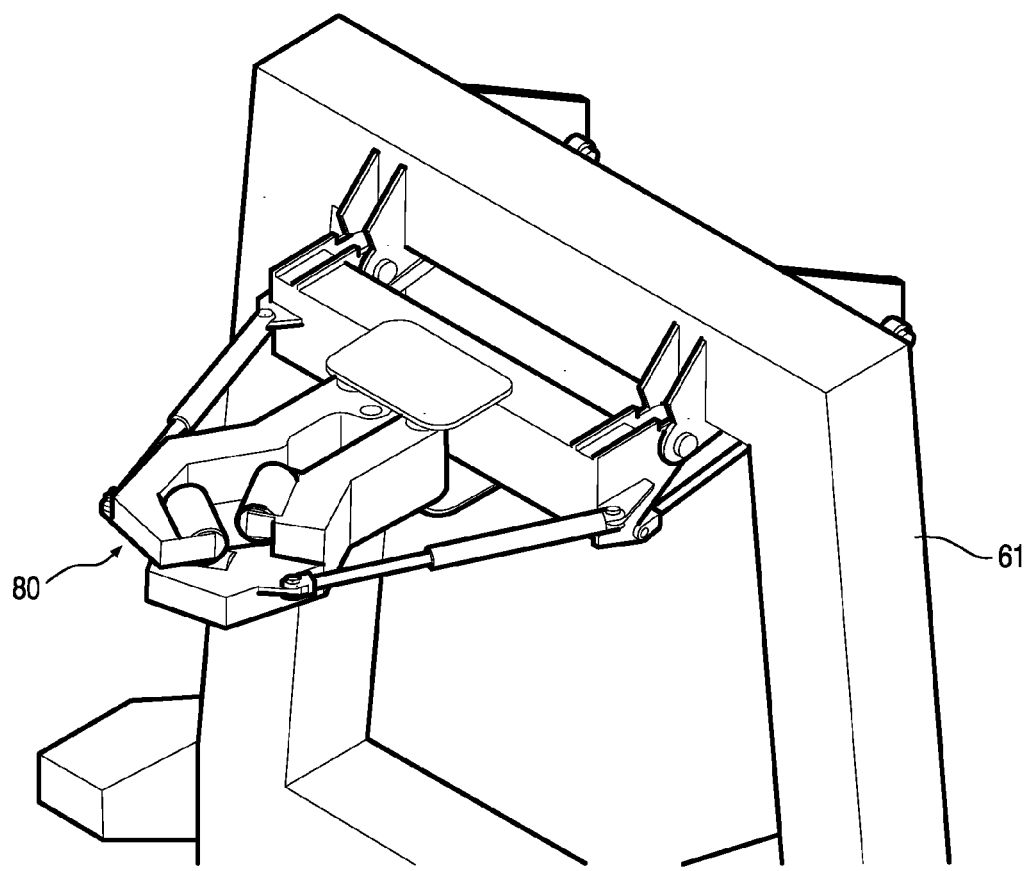
FIG. 31 shows a schematic perspective view of a pipe centralizer of a loader according to the invention, in a closed position.
Figure 32:
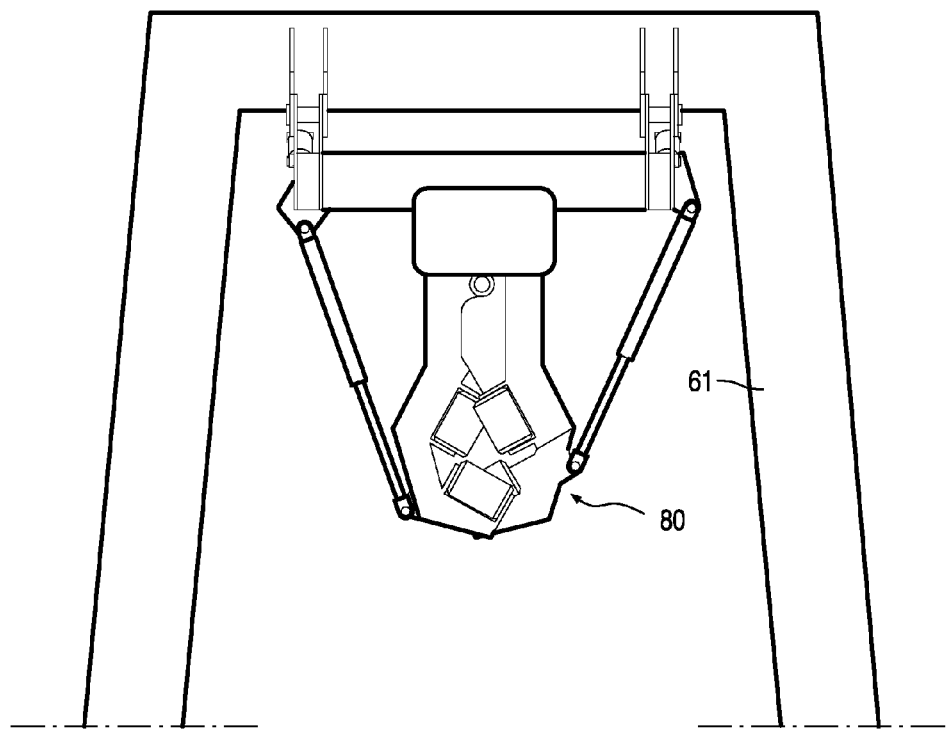
FIG. 32 shows a schematic top view of the pipe centralizer of FIG. 31, in a closed position.
Figure 33:
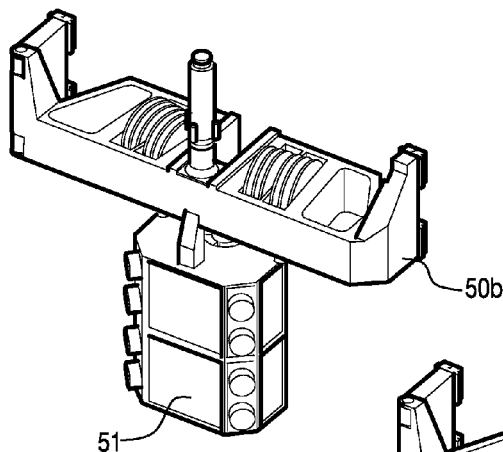
FIG. 33 shows a schematic perspective view of a travelling block of a vessel according to the invention, in a first working position.
Figure 34:
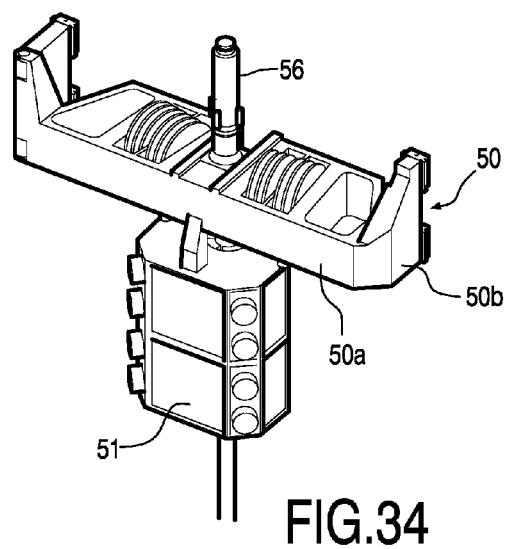
FIG. 34 shows a schematic perspective view of the travelling block of FIG. 33, in a second working position.
Figure 35:
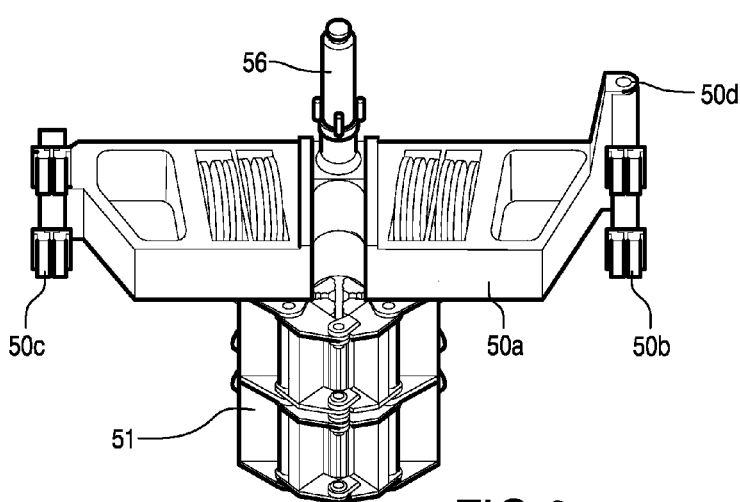
FIG. 35 shows an alternative schematic perspective view of the travelling block of FIG. 33, in the first working position.
Figure 36:
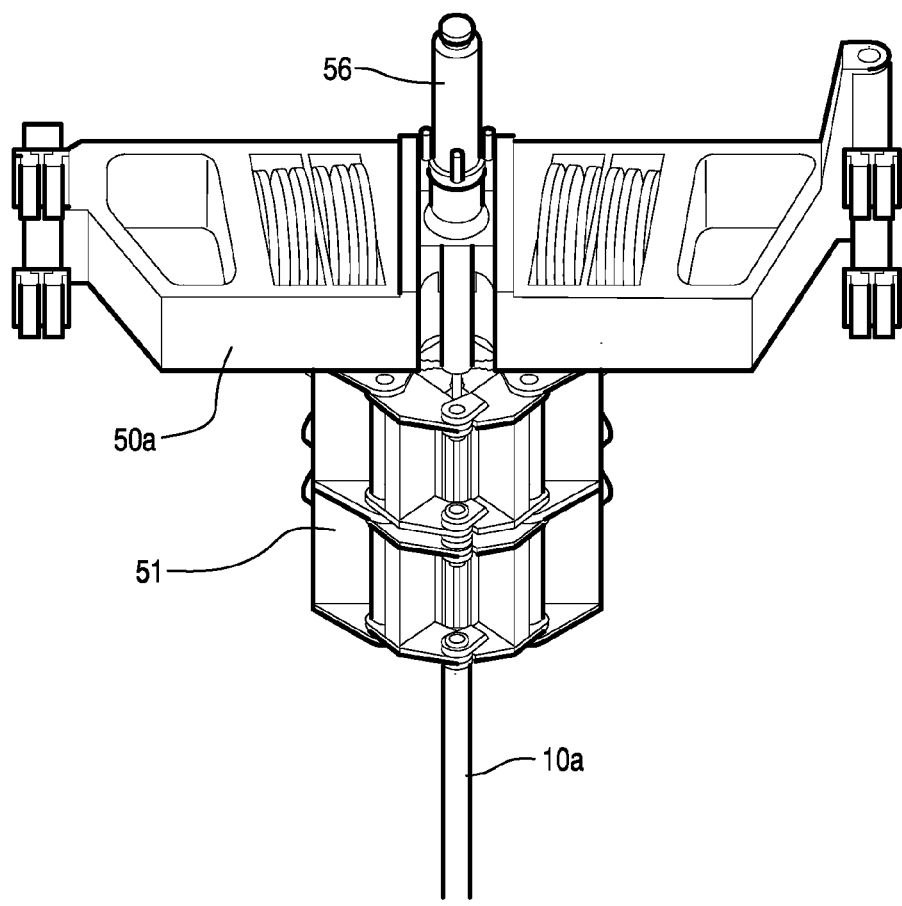
FIG. 36 shows a view in close up of the travelling block of FIG. 35, supporting a pipeline.

It is illustrated that the accessory loader device 60, here the main loader frame 61 thereof, comprises a pipe centraliser 80 adapted to engage on and centralize a pipe section 10b integrated into the accessory 40 and extending upwards when said accessory is aligned with the J-lay firing line. As is preferred the centraliser 80 is movable between an operative and non-operative position (see FIGS. 31 and 32).

The pipe centraliser 80 is required as the pipe section 10b integrated into the accessory is quite lengthy. The reason that such a lengthy pipe section is integrated into the accessory is that this reduces stresses, induced by sea motion while the accessory 40 is hanging into the sea, while a pipe section is welded onto the pipe section 10b.

Figure 25:
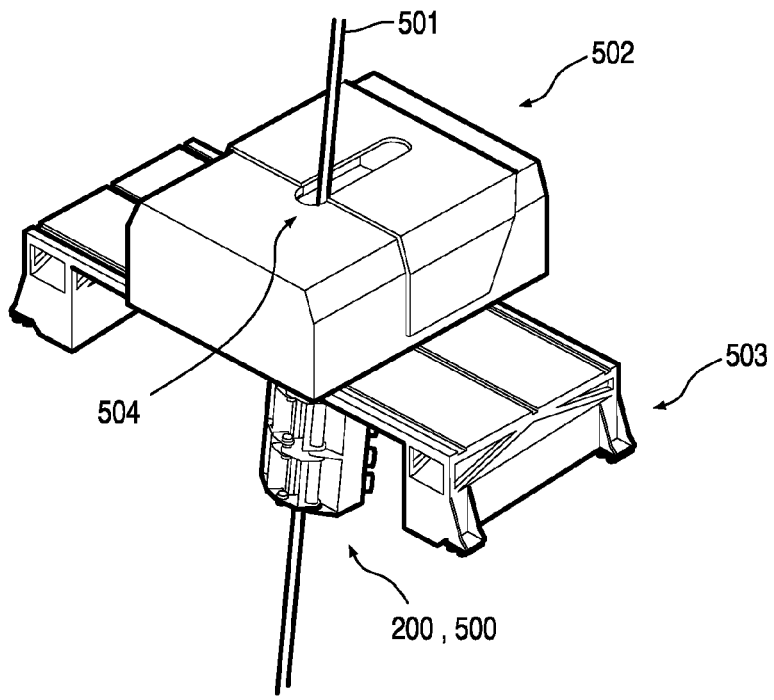
FIG. 25 shows a schematic perspective view of a displaceable hang off clamp of a vessel according to the invention, supporting a pipeline, with a working station in a first working position.

FIG. 25 shows a schematic perspective view of a displaceable hang off clamp 500 of a vessel according to the invention, supporting a pipeline 501, with a working station 502 in a working position. The displaceable hang off clamp 500 is provided with a displaceable hang off clamp frame 503 by which the hang off clamp 500 is supported. On the hang off clamp frame 503 is provided the working station 502. In the embodiment shown, the working station 502 is provided with walls and a roof. The roof is provided with a longitudinal opening 504 for receiving the pipeline.

In the embodiment shown in FIG. 25, the hang off clamp 500, and therefore the working station, is located in its second position in the J-lay firing line of the accessory handling J-lay tower (not shown). Thus the pipeline 501 enters the working station 502 in an essentially vertical direction.

The opening 504 in the roof of the working station 502 has an elongated shape, such that when the hang off clamp is located in its first position the pipeline 501 can enter the working station at an angle.

Figure 26:
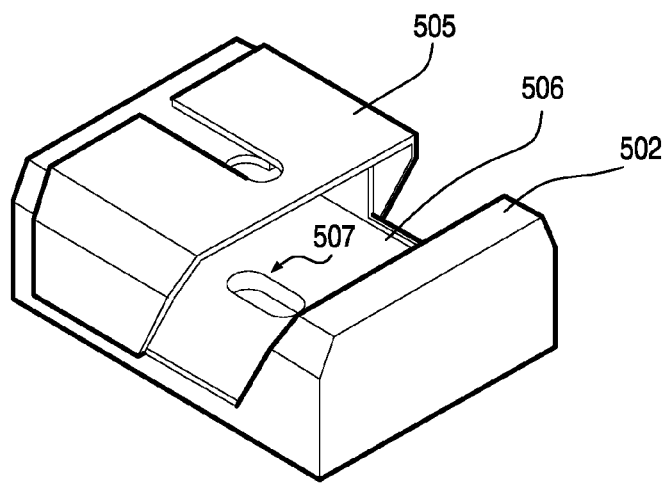
FIG. 26 shows a schematic perspective view of the working station of the hang off clamp of FIG. 24, in a second working position.

In the embodiment shown the working station 502 is provided with a moveable roof section 505. FIG. 25 shows the working station 502 in a working position, with the roof section 505 closed. FIG. 26 shows the working station 502 in a position in which the roof section 505 is in an open position.

Furthermore, in FIG. 26 the floor 506 of the working station 502 is shown, which floor is provided with an elongated opening 507 for guiding the pipeline. The orientation and purpose of the elongated opening 507 is similar to the orientation and purpose of the opening 504 in the roof of the working station.

Figure 27:
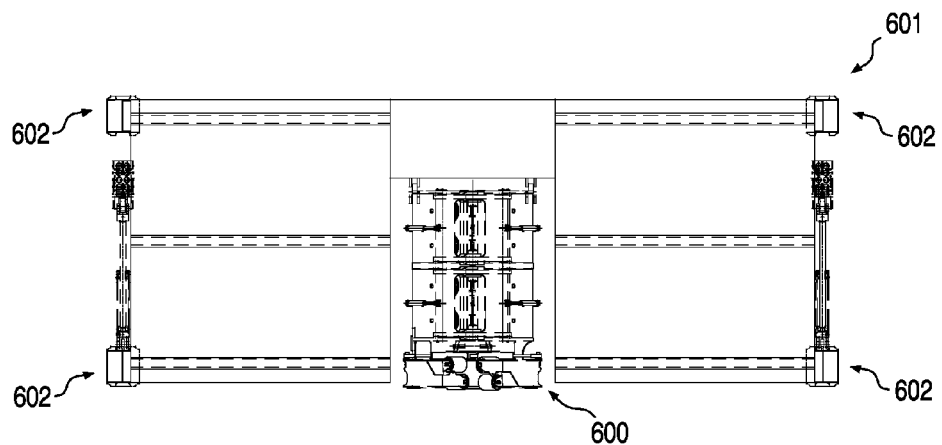
FIG. 27 shows a schematic bottom view of a displaceable hang off clamp of a vessel according to the invention.

FIG. 27 shows a bottom view of a displaceable hang off clamp 600 of a vessel according to the invention. The view shows the hang off clamp 600 in a fully tilted essentially horizontal position, extending along the bottom side of the hang off clamp frame 601. The hang off clamp frame is provided with wheels 602 for supporting the frame on a track.

Figure 28A:
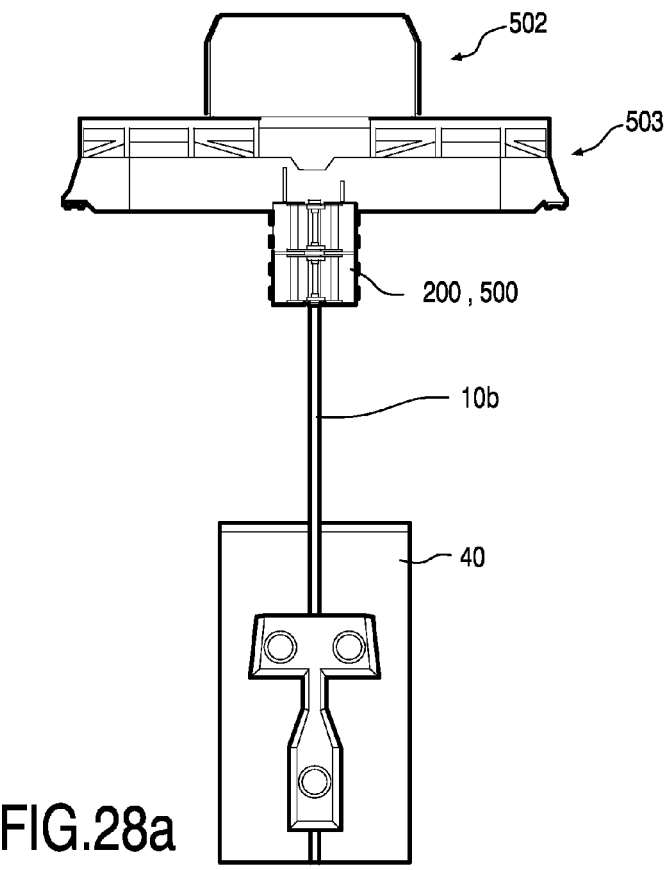
FIG. 28a shows a schematic frontal view of a displaceable hang off clamp of a vessel according to the invention, supporting an accessory.

In FIG. 28a the hang off clamp 200, 500 supports the pipe section 10b of an accessory 40. The hang off clamp is supported by the hang off clamp frame 503, onto which the working station 502 is provided.

Figure 28B:
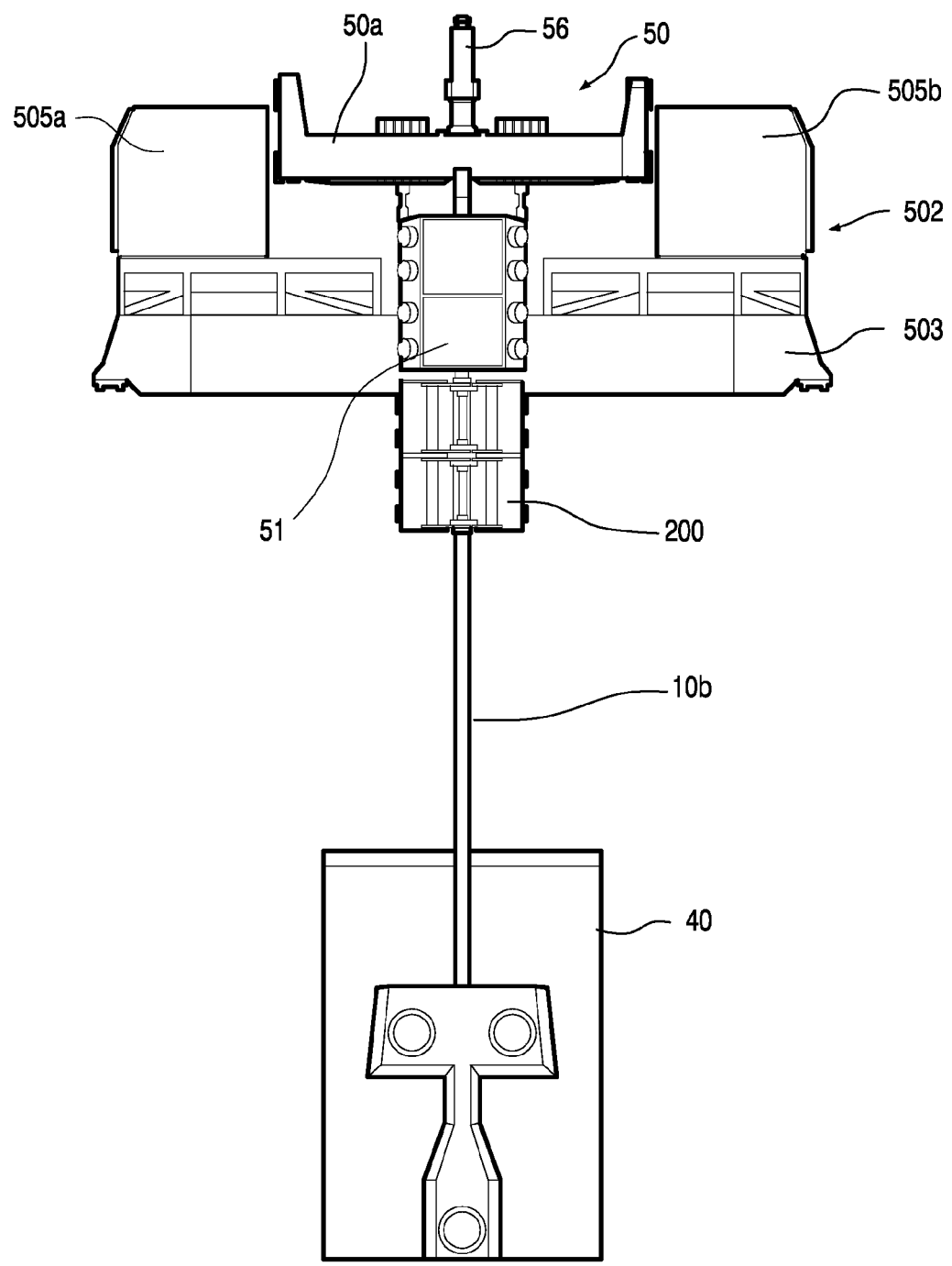
FIG. 28b shows a schematic frontal view of a displaceable hang off clamp of a vessel according to the invention, supporting a accessory, with the working station in a retracted position.
Figure 28C:
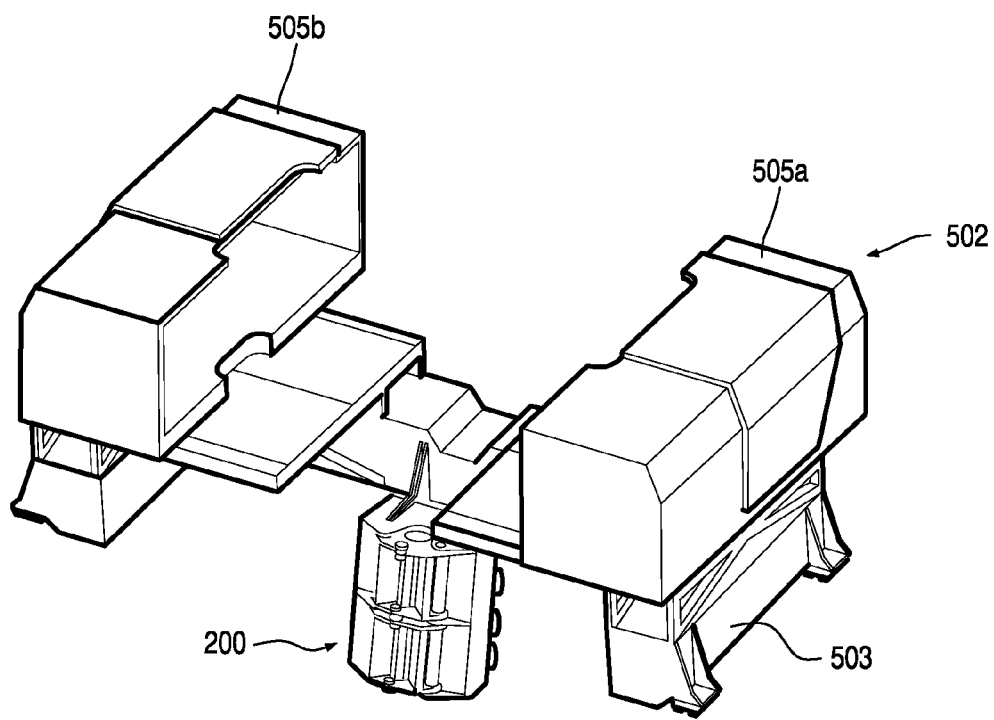
FIG. 28c shows a schematic perspective view of the working station of the hang off clamp in a retracted position.

In FIG. 28b, the working station 502 is visible in a retracted position, in which the working station 502 is split in halves, and wherein each of the halves of the working station have moved to opposite sides of the hang off clamp frame 503. This is also visible in FIG. 28c, in which the working station 502 is visible from a top perspective view. Contrary to the position shown in FIG. 26, in which a roof section has moved to an open position, now the roof section 505 has split in two parts 505a and 505b which have moved to opposite sides. This retracted position of the working station 502 allows the passage of a travelling block 50 with a head clamp 51, similar to the situation shown in FIG. 12.

The FIGS. 33-36 illustrate a travelling block to be used in an assembly for a J-lay pipelaying tower, said assembly comprising a pair of parallel and vertically oriented guide rails, e.g. rails 54 as are visible in FIG. 17.

The travelling block 50 has a frame 50a provided with rail engaging members 50b, 50c, (e.g. rollers or shoes) at opposed horizontal ends of the frame. Head clamp 51 is centrally suspended from the frame 50a.

It is shown that rail engaging member 50b is pivotally connected to the frame 50a about a vertical pivot axis 50d to compensate for variations of the spacing between the guide rails 54.

The frame 50a supports an internal line-up clamp garage 56 adapted for storage of an internal line-up clamp (not shown). The garage 56 is on top of the frame 50a.

In use the J-lay firing line 31 passes through the head clamp 51. The frame 50a has as opening above the head clamp 51 allowing for passage of an A&R wire through the frame and the head clamp along the J-lay firing line 31.

The garage 56 is displaceable relative to the frame 50a between a position in the J-lay firing line (FIG. 36) and a retracted position (FIG. 35) away from said firing line to allow for the passage of the A&R wire.

Figure 37:
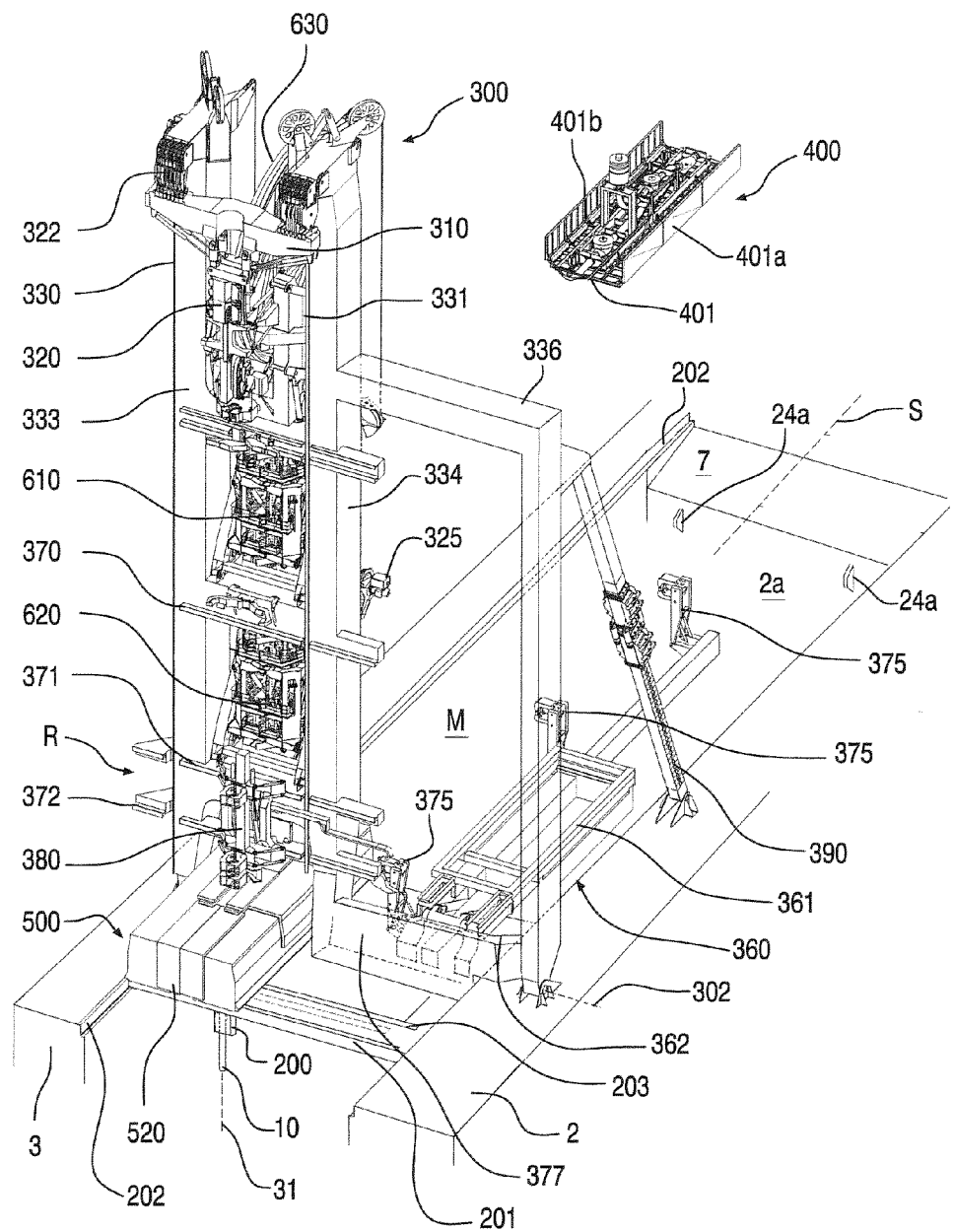
FIG. 37 shows in perspective view from the stinger end another embodiment of a marine pipelaying vessel according to the invention.

With reference to FIG. 37 another pipelaying vessel according to invention will now be discussed. In this vessel several technical features are incorporated that can, individually or in various combinations, be employed in a vessel according to the invention. For example one or more of the technical features may be included in the vessel of any of the claims or of any of the other figures to obtain one or more alternative versions thereof.

The FIG. 37 schematically illustrates an area of the stinger end of a hull of a pipelaying vessel having S-lay capability. The figure shows two cantilever structures 2, 3 that extend at the stinger end of the hull, generally in longitudinal direction of the vessel, here embodied as integral portions of the hull that lengthen the waterline of the vessel so as to provided water displacement and associated uplift. Other embodiments of the cantilever structures, e.g. arranged at a distance above the waterline, are also envisaged. As indicated the cantilevers may even be formed by ends of the two hulls of a catamaran vessel.

In general the cantilevers 2, 3 and aft end face 2a of the hull that is centrally between the cantilevers 2, 3 delimit a U-shape contoured opening M when seen from above. This U shape is preferred as it is open at the side remote from the hull, at least so as to allow raising the stinger to a transit position above the waterline. When closed at said remote end side by a bridging transverse hull portion that extends partly below waterline, a moonpool type opening would be formed from which the stinger enters the sea, which is also possible yet not preferred.

The vessel has an S-lay pipeline assembly installation represented here highly schematically by a line S and not shown in more detail in FIG. 37 as such installations are well known in the art.

Such an assembly installation commonly includes one or more welding stations to weld pipe sections end to end in horizontal orientation and one or multiple tensioners in series. The S-lay tensioners are arranged downstream of the welding stations the tensioners and are mounted on an S-lay working deck of the hull to engage on a substantially horizontal section of the pipeline. As is preferred the S-lay working deck also has a roof and walls to create a shielded environment around the assembly installation.

It is possible, and common, that a pipeline coating station is provided between the welding stations and the first tensioner in order to coat the pipeline after welding, e.g. at the location of the weld.

The assembly of the pipeline in S-lay takes place in substantially horizontal orientation as is well known in the art.

In FIG. 37 it is illustrated that the S-lay pipeline assembly installation is arranged in the longitudinal midplane of the vessel, but a laterally offset position of the line S with respect to the vessel midplane is also envisaged.

Figure 2:
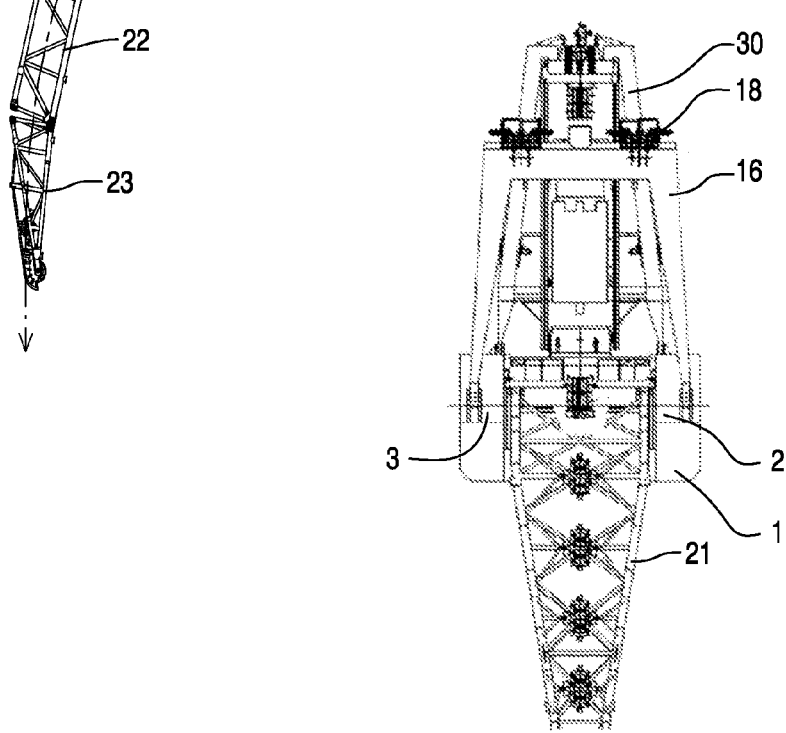
FIG. 2 shows a schematic back view, partially is see through, of a marine pipelaying vessel according to the first aspect of the invention.

The FIG. 37 does not show—for reasons of clarity of the figure—a stinger for guiding and supporting the pipeline that is assembled on the S-lay assembly line S along a downwardly curved pipeline trajectory as is known in the art of S-lay. The stinger is e.g. arranged as has been described above. The stinger is pivotally connected to the hull such that the stinger, or at least a first stinger section, extends in the opening M between the two cantilever structures 2, 3. The stinger can be held by a stinger support assembly, e.g. as shown in FIG. 1, to assume a pipelaying position wherein the pipeline moves along a curve downwardly over the stinger from substantially horizontal along line S to a J-lay orientation, e.g. vertical or near vertical. The stinger can also be tilted steeply downward about its pivot axis to assume a vertically downward position and allowing for significant clearance between the stinger and the J-lay firing line 31 so that an accessory fitted in the pipeline, e.g. at an intermediate position or at a leading or trailing end thereof, can be lowered into the sea passed the steeply downward oriented stinger.

FIG. 37 illustrates the possibility that a deck 7 of the vessel adjoining the s-lay assembly line deck is arranged so as to slope from the last tensioner (not shown) downwards, e.g. to stinger pivot connection structure 24a.

The FIG. 37 also illustrates the presence of an accessory handling J-lay tower 300 at the stinger end of the hull, as is preferred supported by the cantilevers 2, 3.

The FIG. 37 also illustrates, merely as an example and not at a specific location on the vessel, an accessory 400 that is to be connected to the pipeline, e.g. at an intermediate location of the pipeline. The pipeline is primarily assembled and laid in S-lay mode as this is the most efficient pipelaying method offshore.

The accessory 400 is illustrated here by way of example to include a mud mat 401, here with tiltable mud mat side members 401a,b, as is known in the art to reduce the width of the accessory during storage and handling in the J-lay tower 300. Preferably after launch into the sea, or only upon placement on the seafloor, the side members are deployed to obtain maximum stability on the seafloor.

The tower 300 is adapted for supporting an accessory 400 to be connected to the pipeline 10 and for launching in J-lay mode said pipeline 10 with the accessory 40 connected thereto along a J-lay firing line 31 (see e.g. FIG. 6). As is common this J-lay firing line 31 is vertical or near vertical, but more forwardly inclined orientations of the tower, e.g. up to an angle of 30 degrees to vertical, are also possible.

As is explained above, during J-lay operation—in particular when launching an accessory 400 by means of the tower 300 into the sea—the stinger is kept in a retracted position thereof away from the J-lay firing line 31 so as to not interfere with the lowering of the pipeline and accessory along the J-lay firing line.

The FIG. 37 also illustrates the presence of a displaceable hang off clamp 200 for supporting the weight of the launched pipeline 10 when disconnected from the one or more tensioners of the S-lay assembly line S that are arranged on a S-lay working deck of the vessel.

The clamp 200 is preferably embodied as a friction clamp, although a collar clamp, or combined collar and friction clamp, is also possible.

The clamp 200 is displaceable while supporting the weight of the launched pipeline between a first position and a second position (see FIG. 37).

In the first position the hang off clamp 200 is clamped on the pipeline 10 downstream of the one or more S-lay tensioners during S-lay operation (preferably with the pipeline at standstill) to allow disconnection of the pipeline from the tensioners, e.g. by severing the pipeline between said clamp and the one or more tensioners. For example said first position is within 10 meters downstream of the last tensioner.

In the second position the clamp 200 is positioned in the J-lay firing line 31 of the accessory handling J-lay tower 300 such that the accessory 400 can be supported above the upper end of the pipeline 10 held by the clamp 200 and can be connected thereto.

The J-lay tower 300 allows the pipeline 10 and the connected accessory 400 to be laid in J-lay mode while connecting further pipe sections (not shown) to the pipeline 10 above the accessory 400 at least until the accessory 400 has been lowered past below the retracted stinger (see e.g. FIG. 13).

If the accessory 400 is a pipeline end terminal (PLET) fitted at the trailing end of the pipeline, it is envisaged that the lowering to the seafloor is performed by using the A&R system of the vessel. Then the A&R cable is brought into the firing line above the accessory to be attached to the PLET. This cable runs from an A&R winch along the S line through the S-lay tensioners, over sheaves along the tower to said firing line.

The J-lay tower 300 is illustrated here to be tiltable about a horizontal tower pivot axis 302. In this way, the J-lay lay or departure angle in J-lay of the pipeline 10 with the accessory 400 is adjustable, which is particularly advantageous to allow for operations in different water depths.

In an embodiment the tower 300 can be tilted through the vertical position away from the hull into an overboarding position, e.g. to facilitate handover operations of the pipeline (e.g. to a platform).

The accessory 400 to be connected to the pipeline 10 is held at the J-lay firing line side of the accessory handling J-lay tower 300, here the side remote from the hull of the vessel as is preferred.

FIG. 37 also illustrates the provision of a displaceable hang off clamp frame 201 that supports the hang off clamp 200, preferably with the clamp 200 beneath the frame 201.

As is a preferred embodiment the vessel is provided with a pair of rails 202 in longitudinal direction, preferably rectilinear rails, upon which the frame 201 is supported and along which the frame 201 travels. Each rail 202 has a section extending along a cantilever 2, 3, e.g. (as here) directly adjacent the corresponding side of the opening M. The rails 202 preferably extend until near the last tensioner of the S-lay assembly line S.

In a practical embodiment the rails 202 are embodied as skid rails to allow for skidding of the frame 201 over the rails 202, e.g. the rails having a series of holes or other engagement formations onto which hydraulic skid jack assemblies can couple to skid the frame 201 in longitudinal direction of the vessel.

The FIG. 37 illustrates the possibility that the J-lay firing line 31 is not in a common vertical plane with the S-lay firing line S (e.g. with the S line in the midplane of the vessel). Then the J-lay line 31 is laterally offset from the S-lay firing line S. This may be advantageous e.g. to allow for the loading of an accessory 400 into the tower to be done laterally.

As is a possibility and illustrated here an accessory loading device 360 can be arranged laterally offset from the J-lay firing line 31, in fact next to the actual J-lay tower structure.

If the J-lay firing line 31 is laterally offset from the S-lay firing line S the clamp 200 will be supported such, e.g. by the frame 201, that a displacement between the first position, aligned with the line S, and the second position, in the J-lay firing line 31, of the clamp 200 includes a lateral displacement of said clamp 200 whilst supporting the launched pipeline after it is disconnected from the S-lay assembly line tensioners, e.g. by skidding the clamp 200 laterally with respect to the frame 201.

FIG. 37 schematically illustrates one or more transverse hang off clamp support rails 203 on the frame 201 along which the clamp 200 is displaceable in lateral direction. As this is in addition to the longitudinal displacement of the frame 201, e.g. along rails 202, the clamp 200 is basically supported by an X-Y support frame 201.

As explained, the clamp 200 is also supported by the frame 201 so as to be tiltable about a horizontal axis relative to the frame 201 between a substantially horizontal orientation wherein the clamp 200 can engage on a horizontal section of the pipeline along line S and a J-lay orientation when the pipeline 10 extends in the J-lay firing line 31.

FIG. 37 illustrates the possibility that the hang off clamp frame 201 supports a working station 500 in addition to supporting the hang off clamp. The station 500 comprises a floor above the hang off clamp 200. The working station provides a shielded environment for welding, e.g. of the accessory to the pipeline supported by the hang off clamp 200. The working station is embodied preferably as a cabin comprising not only the floor, but also a roof and walls to establish the shielded environment.

Portions 520 of the working station 500 (e.g. doors, roof panels, or entire sections of the station, e.g. when the station is composed of two mobile halves that are translatable in lateral direction) are arranged in movable manner, e.g. sliding in lateral direction, to allow for opening of the working station when it is desired to move the clamp frame 201 with the clamp 200 and the station 500 away from the firing line 31 towards the stinger pivot axis. This is e.g. done when the accessory 400 has been connected to the pipeline 10 and the pipeline is then to be launched. Then the weight of the pipeline is held by travelling block 310 with head clamp 320 of the J-lay tower 300 and the clamp 200 is released and opened. Also the working station is opened to allow the frame 201 to be moved towards the axis 24 to clear the firing line 31 and allow for the passage of the pipeline with the accessory 400. The frame 201 is then returned to the position with the clamp 200 in the J-lay firing line and with the clamp 200 underneath the head clamp 320. Then the weight of the pipeline 10 is then taken over again by the clamp 200 and clamp 320 is released and raised. The station 500 then serves as a welding station when a new pipe section is to be connected above the accessory as part of the launching of the pipeline with the accessory 400 further into the sea in J-lay mode.

FIG. 37 illustrates the possibility that the vertically movable travelling block 310 with the head clamp 320, here a friction clamp, is connected via one or more cables 322 to one or more winches 325 to allow for controlled vertical motion of the head clamp and the pipeline suspended from the head clamp.

FIG. 37 illustrates the possibility that the tower 300 is provided with a pair of parallel vertical guide rails 330, 331 for the travelling block 310.

FIG. 37 illustrates the possibility that the loading device 360 does not convey the accessory 400 through an opening between the vertical guide rails of the travelling block 310 in the tower, but instead is adapted to bring the accessory laterally alongside the J-lay firing line allowing then to introduce the accessory 400 by translation in lateral direction into the J-lay firing line 31.

In the example illustrated here in FIG. 37 the accessory loader device 360 is generally positioned laterally next to the actual J-lay tower structure with its two main load bearing legs 333, 334.

FIG. 37 illustrates the possibility that accessory loader device 360 is adapted to receive an accessory thereon on in a substantially horizontal receiving position (see FIG. 37) and to bring said accessory 400 in an upwardly tilted position oriented (in side view) alongside the J-lay firing line of the tower 300. Then the accessory 400 is translated along one or more horizontal support rails 370, 371 that are provided on the tower 310, e.g. then aligned with one or more rails on the loader, so as to arrive in a position aligned with the J-lay firing line 31.

In another embodiment (not shown) the tiltable loader device 360 is dispensed with entirely and the accessory 400 is placed by a crane (not shown) directly in the firing line on the tower 300, e.g. on the rails 370, 371 or on extensions of the rails 370, 371 next to the tower.

FIG. 37 illustrates the possibility that the device 360 comprises a main loader frame 361 that is pivotally (via horizontal pivot axis 362) connected to the tower 300, here to a lower beam 377 thereof, so as to be pivoted by an associated pivoting device (e.g. a hydraulic jack arrangement).

The vessel may have a crane with a boom having an effective reach that covers the loader device 360 in its receiving position, e.g. a mast crane with a slewable boom, that allows allowing to lift an accessory 400 and place it on the loader device 360, e.g. with the main loader frame in horizontal position.

The accessory loader device 360 may include a loader subframe adapted to be engaged with and retain thereon the accessory 400. The loader subframe may be supported movably on a main loader frame 361 of the loader device 360 to allow for lateral translation of the subframe with the accessory thereon onto the rails 370, 371 in order to align the accessory with the firing line 31.

FIG. 37 illustrates the possibility that the accessory loader device, here the main loader frame 361, is provided with one or more pipe section grippers 375, here multiple spaced apart pipe section grippers, said pipe grippers being adapted to grip and retain a pipe section to be connected to the launched pipeline in J-lay mode.

Instead of the pipe section loader being integrated with the accessory loader device, one can also envisage the provision of an independent pipe section loader device, e.g. with a pivotal boom provided with pipe grippers that is pivotal between a horizontal pick-up position and an erected position. Example of such an independent pipe section loader device are disclosed e.g. in EP 2 218 953.

The FIG. 37 illustrates the possibility that the J-lay tower is provided with one or more J-lay tensioners 610, 620, e.g. two above one another, in addition to the one or more S-lay tensioners that are mounted on the S-lay assembly working deck of the vessel for use during S-lay.

The FIG. 37 illustrates the possibility that the one or more J-lay tensioners 610, 620 are mounted in retractable manner on the tower 300, between an active position in the firing line 31 and a retracted position out of the firing line 31, here between the legs 333, 334 of the tower. Examples of a retractable arrangement of the J-lay tensioners are disclosed e.g. in EP 2 218 953.

The FIG. 37 illustrates the possibility that the J-lay tower is provided with an aligner or pipeline guiding device 630, here a guide wheel, at an elevated position above the one or more J-lay tensioners 610, 620. As is known in the art of offshore pipelaying an aligner device 630 is adapted to guide a pipe that is unrolled from a pipe reel or below decks carrousel in a curved path to the J-lay firing line 31. For example the unrolled pipeline is a flex pipe or a rigid pipe, in the latter case provision being made for a straightener between the aligner device 630 and the uppermost J-lay tensioner 610 as is known in the art. The aligner device 630 could be mounted on the tower in retractable manner, so as to be movable between a retracted position out of the firing line (e.g. as shown here to allow for passage of the travelling block 310) and an active position wherein it guides the unrolled pipeline into the firing line 31. Examples are e.g. disclosed in EP 2 218 953.

Instead of being retractable mounted on the tower, a J-lay tensioner 610, 620 could also be arranged to be removable mounted on the tower 300, so as to be only present when use of such J-lay tensioner is envisaged. A vessel mounted crane, when present, could be employed to place and remove the one or more removable J-lay tensioners.

The one or more J-lay tensioners 610, 620 can e.g. be employed when reel-lay mode of pipeline laying is envisaged, e.g. when a hybrid pipeline is made with rigid pipeline part that is launched in S-lay or J-lay and with a flexible pipeline part that is supplied from a reel to the tower.

In an alternative embodiment the J-lay tower is embodied solely to lay pipeline provided with an accessory along the J-lay firing line 31 by means of the reel-lay method, e.g. the tower not having a travelling block and solely having one or more J-lay tensioners in the tower in addition to the S-lay assembly installation and stinger. In that case the pipeline from the reel is passed through the one or more J-lay tensioners and then connected to the accessory. Then the weight of the pipeline is transferred from clamp 200 to said one or more J-lay tensioners and with the stinger already in retracted position the pipeline with accessory is then lowered into the sea.

It is also envisaged that e.g. the lower tensioner 610 is employed when pipeline is launched in J-lay mode, with tensioner 610 holding the launched pipeline and with a new section of straight non-reeled pipeline being connected to said pipeline above the lower tensioner 610. This requires the provision of a pipe section loading device that is adapted to supply a new pipeline section at a position in the J-lay firing line above the tensioner 610. Such pipe loaders, e.g. having a pivoting boom with grippers on articulated arms, are known in the art, e.g. from EP 2 218 953.

It is also possible to provide a mobile welding station on the tower 300 to be employed for welding above the tensioner 610, e.g. from EP 2 218 953.

FIG. 37 also illustrates the possibility to have a dedicated pipe line-up tool 380 on the tower 300 for use during continued J-lay operation when pipe sections are welded onto the launched pipeline. Here it is illustrated that the tool 380 is retractable as it is guided over horizontal rails 371, 372 to allow for lateral displacement between an active position in the firing line 31 and a retracted position (at R) out of the firing line to allow for the positioning of an accessory 400 at said location in the tower 300.

FIG. 37 illustrates the possibility that the actual J-lay tower 300 is integrated into a combined J-lay tower and loader device support tower structure, wherein the J-lay tower and the accessory loader device are side by side in lateral direction.

In this example the tower structure includes a third leg 335 that is pivotally supported on cantilever 2 at its lower end and connected to the central leg via lower and upper horizontal cross-beams 336.

In an embodiment not shown in the figures the accessory loader device 360 associated with the tower 300 is independently mounted on the vessel, so not on the tower itself or sharing a common support structure with the tower onto the cantilevers. For example the accessory loader device may include a skiddable loader, which is skiddable over dedicated rails towards the J-lay tower, possibly into, through, or underneath the tower, to bring the accessory in line with the J-lay firing line.

FIG. 37 illustrates the possible provision of one or more telescopic adjuster devices 390 to allow for variation of the inclination of the tower 300 and to maintain the desired inclination. Such adjuster devices 390 are known in the art.

The invention claimed is:

1. A marine pipelaying vessel for S-lay pipelaying an offshore pipeline and integrating one or more accessories into the pipeline, the vessel comprising:
a hull having a stinger end and two cantilever structures extending at the stinger end of the hull;
a pipeline assembly installation including one or more welding stations to weld pipe sections to the end of a launched pipeline;
one or more tensioners downstream of the pipeline assembly installation for supporting the weight of the launched pipeline;
a stinger for guiding the launched pipeline in a curved pipeline trajectory, said stinger being pivotably connected to the stinger end of the hull such that the stinger is pivotable about a horizontal stinger pivot axis, and wherein the stinger extends between the two cantilever structures;
an accessory handling J-lay tower at the stinger end of the hull, for supporting an accessory to be connected to the pipeline and for launching in J-lay mode said pipeline with the accessory connected thereto along a J-lay firing line;
a stinger support assembly for supporting the stinger in a pipelay position, and for allowing movement of the stinger between the pipelay position and a steep downwardly pivoted retracted position by pivoting the stinger about its stinger pivot axis, wherein the stinger in the retracted position is away from the J-lay firing line; and
a displaceable hang off clamp for supporting the weight of the launched pipeline when disconnected from the tensioners, said clamp being displaceable while supporting the weight of the launched pipeline between a first position in which the hang off clamp can be clamped on the pipeline downstream of the one or more tensioners during S-lay to allow disconnection of the pipeline from the tensioners and a second position in the J-lay firing line of the accessory handling J-lay tower such that the pipeline supported by the hang off clamp can be aligned with the accessory supported by the accessory handling J-lay tower and can be connected thereto; and
a displaceable hang off clamp frame in which the hang off clamp is tiltably supported about a horizontal clamp tilt axis,
wherein the hang off clamp frame is displaceable substantially horizontal between the first and second position, and
wherein the J-lay tower allows the pipeline and connected accessory to be laid in J-lay mode while connecting further pipe sections to the pipeline at least until the accessory has been lowered past below the retracted stinger.

2. The vessel according to claim 1, wherein the hang off clamp frame supports a working station comprising a floor above the hang off clamp, the working station providing a shielded environment for welding the accessory to the pipeline.

3. The vessel according to claim 1, wherein the vessel is provided with two parallel rails supporting the hang off clamp frame between the first and second position.

4. The vessel according to claim 1, wherein the accessory handling J-lay tower is tiltable about tower pivot axis parallel to stinger pivot axis.

5. The vessel according to claim 1, further comprising an accessory loader device adapted to receive the accessory in a receiving position, and to bring the accessory into the J-lay firing line so as to allow for connection thereof to the launched pipeline.

6. The vessel according to claim 5, wherein the accessory loader device comprises one or more pipe section grippers allowing the accessory loader device to supply pipe section to the J-lay tower during pipelaying in J-lay mode.

7. The vessel according to claim 1, further comprising a stinger securing system for securing the stinger in the retracted position.

8. The vessel according to claim 1, further comprising an accessory loader device adapted to receive the accessory in a horizontal receiving position, and to bring the accessory into the J-lay firing line so as to allow for connection thereof to the launched pipeline, wherein the accessory loader device is mounted on the accessory handling J-lay tower.

9. The vessel according to claim 8, wherein the accessory loader device comprises one or more pipe section grippers allowing the accessory loader device to supply pipe section to the J-lay tower during pipelaying in J-lay mode.

10. The vessel according to claim 1, further comprising a stinger securing system for securing the stinger in the retracted position, the stinger securing system comprising a winch and a cable connectable to the stinger, allowing to pull the steep downwardly retracted stinger further away from the J-lay firing line.

11. A method for S-lay pipelaying an offshore pipeline and integrating one or more accessories into the pipeline wherein use is made of the vessel according to claim 1, said method comprising the following steps:
welding pipe sections to the end of a launched pipeline, wherein one or more tensioners support the weight of the launched pipeline;
providing the displaceable hang off clamp in a first position;
clamping the hang off clamp on the pipeline downstream of the one or more tensioners during S-lay;
cutting the launched pipeline between the one or more tensioners and the hang off clamp;
pivoting the stinger from the pipelay position to a steep downwardly pivoted retracted position, wherein the stinger in the retracted position is away from the J-lay firing line;

displacing the hang off clamp while supporting the weight of the launched pipeline from the first position to a second position in the J-lay firing line;

providing an accessory to the accessory handling J-lay tower and supporting the accessory by the accessory handling J-lay tower;

aligning the pipeline supported by the hang off clamp with the accessory supported by the accessory handling J-lay tower;

connecting the pipeline supported by the hang off clamp with the accessory supported by the accessory handling J-lay tower;

launching in J-lay mode said pipeline with the accessory connected thereto along a J-lay firing line; and connecting further pipe sections to the pipeline and lowering the pipeline at least until the accessory has been lowered past below the retracted stinger.

12. The method according to claim 11, further comprising the step of pivoting the stinger from the steep downwardly pivoted retracted position upward to the pipelay position to guide the launched pipeline in a curved pipeline trajectory.

* * * * *